(12) United States Patent
Fukushima et al.

(10) Patent No.: US 8,525,530 B2
(45) Date of Patent: Sep. 3, 2013

(54) VARIABLE CAPACITOR AND POSITION INDICATOR

(75) Inventors: Yasuyuki Fukushima, Saitama (JP); Hiroyuki Fujitsuka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 281 days.

(21) Appl. No.: 13/071,308

(22) Filed: Mar. 24, 2011

(65) Prior Publication Data
US 2011/0241703 A1    Oct. 6, 2011

(30) Foreign Application Priority Data

Mar. 31, 2010    (JP) .................................. 2010-080242

(51) Int. Cl.
*G01R 27/26*    (2006.01)

(52) U.S. Cl.
USPC ............ 324/661; 324/660; 324/662; 324/658

(58) Field of Classification Search
USPC .......................... 324/658–690; 345/173–178
See application file for complete search history.

(56) References Cited

U.S. PATENT DOCUMENTS

| | | | |
|---|---|---|---|
| 5,206,785 A | | 4/1993 | Hukashima |
| 6,437,772 B1* | | 8/2002 | Zimmerman et al. ......... 345/160 |
| 6,853,369 B2* | | 2/2005 | Fukushima et al. .......... 345/179 |
| 2003/0122795 A1* | | 7/2003 | Fujitsuka et al. ............. 345/173 |
| 2007/0108993 A1* | | 5/2007 | Vranish ........................ 324/662 |
| 2008/0257613 A1* | | 10/2008 | Katsurahira ............... 178/19.04 |
| 2009/0076770 A1 | | 3/2009 | Fukushima et al. |
| 2009/0114459 A1* | | 5/2009 | Fukushima et al. ....... 178/19.03 |
| 2011/0001496 A1* | | 1/2011 | Schlechtriemen et al. ... 324/686 |
| 2013/0088459 A1* | | 4/2013 | Yeh et al. ...................... 345/174 |

FOREIGN PATENT DOCUMENTS

| | | |
|---|---|---|
| JP | 64053223 A | 3/1989 |
| JP | 4096212 A | 3/1992 |
| JP | 05275283 A | 10/1993 |
| JP | 2010129920 A | 6/2010 |

OTHER PUBLICATIONS

Extended European Search Report, for corresponding European Application No. 11160472.4, dated Nov. 16, 2011, 3 pages.

* cited by examiner

*Primary Examiner* — Jermele M Hollington
*Assistant Examiner* — Adam Clarke
(74) *Attorney, Agent, or Firm* — Seed IP Law Group PLLC

(57) ABSTRACT

A variable capacitor is disclosed, including: a dielectric having a first surface and a second surface opposing the first surface; a first electrode disposed on the first surface of the dielectric; a second electrode disposed to face the second surface of the dielectric; and a pressing member configured to cause the second electrode and the dielectric to contact each other when a pressing force is applied thereto (e.g., when a pen-shaped position indicator including the variable capacitor is pressed against a tablet). In the variable capacitor, the second electrode includes at least one electrode piece having an abutting central portion, against which the pressing member transmits a pressing force applied thereto, and an extension portion that radially extends from the abutting central portion toward a circumferential portion of the dielectric. A contact area between the dielectric and the second electrode is changed in accordance with a pressing force applied to the pressing member, to thereby change a capacitance of the variable capacitor.

20 Claims, 23 Drawing Sheets

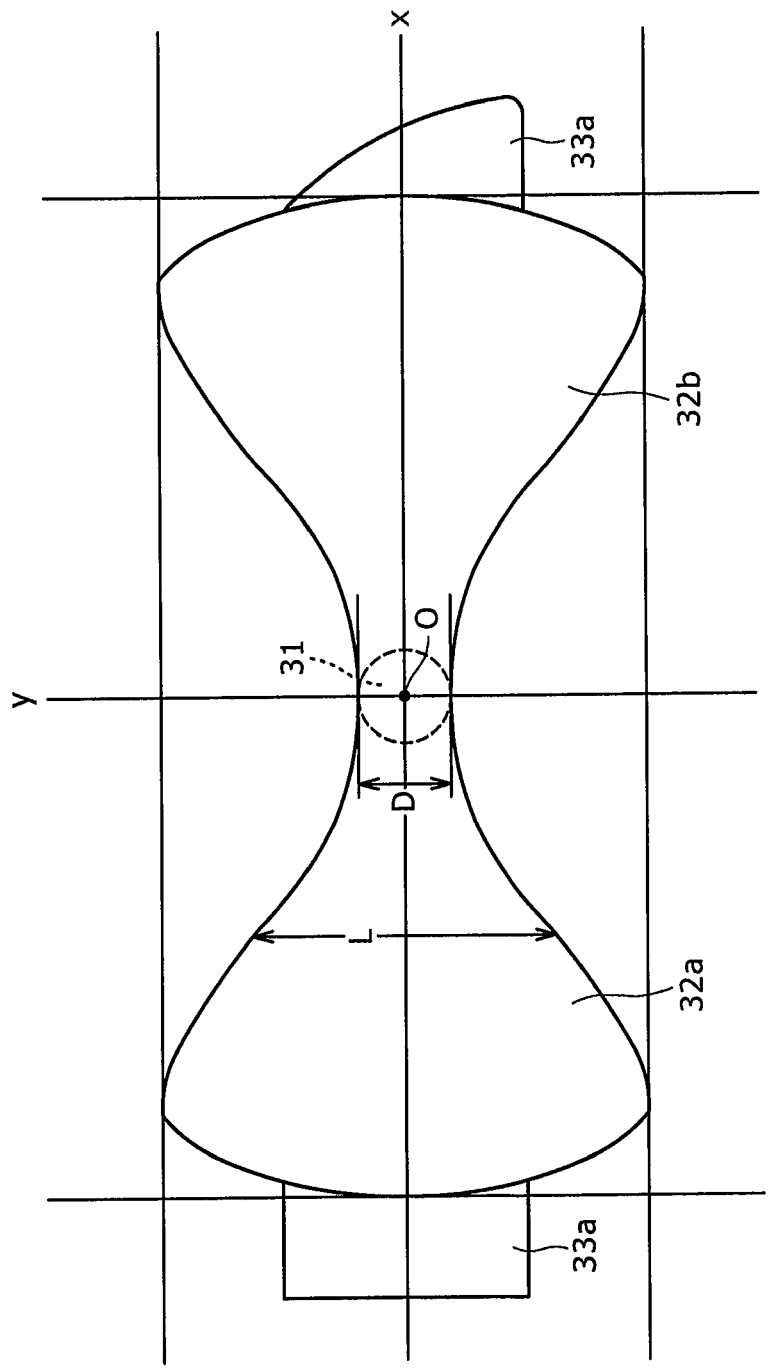

<CALCULATION FORMULA>
$C = \varepsilon_0 \cdot \varepsilon_s \cdot A / d$

C : CAPACITANCE (F)
$\varepsilon_0$ : 8.85E−12
$\varepsilon_s$ : PERMITTIVITY
A : ELECTRODE AREA (m2)
d : DISTANCE BETWEEN ELECTRODES (m)

CAPACITANCE-LOAD CHARACTERISTICS

AREA-LOAD CHARACTERISTICS

VARIABLE CAPACITOR AND POSITION INDICATOR

CROSS-REFERENCE TO RELATED APPLICATION

The present application claims priority under 35 U.S.C. §119(a) of Japanese Application No. 2010-080242, filed Mar. 31, 2010, the entire content of which is incorporated herein by reference.

BACKGROUND OF THE INVENTION

1. Field of the Invention

The present invention relates to a variable capacitor whose capacitance is changed in accordance with a pressure or a displacement applied thereto from the outside, and a position indicator using the same.

2. Description of the Related Art

For example, as shown in Japanese Patent Laid-Open No. Sho 64-53223 (hereinafter referred to as Patent Document 1), there is known a position input device composed of a pen type position indicator and a position detector. The position detector includes a sensor portion for detecting a position indicated by the position indicator.

In general, the sensor portion has a flat plate-like shape, and includes an indication detecting plane for detecting an input position indicated by the position indicator. Also, in the case of an electromagnetic induction type position detector, the sensor portion is provided with a large number of long and thin loop coils which are arranged in an X-axis direction and in a Y-axis direction. On the other hand, the position indicator is provided with a resonance circuit composed of a coil and a capacitor.

The position detector causes currents (transmission currents for excitation) having respective specific frequencies to flow through the loop coils of the sensor portion, and causes the loop coils of the sensor portion to generate magnetic fields from the loop coils. Then, when the position indicator is close to the loop coil which is generating the magnetic field, the resonance circuit of the position indicator resonates with the loop coil based on electromagnetic induction to generate an induced magnetic field. Next, the generation of the magnetic field from the loop coil is stopped. And, next, the induced magnetic field generated from the resonance circuit of the position indicator is received by the loop coil, thereby detecting a signal current (received current) being caused to flow through that loop coil. The position detector carries out this operation on every loop coil on a one-by-one basis, thereby detecting the position of the position indicator based on the received current.

The existing position indicator includes a core (rod) body for detecting a pen pressure, and also includes a mechanism for making an inductance of the coil variable in accordance with the pen pressure applied to the core body. As a result, in the position indicator, a resonance frequency of the resonance circuit is changed in accordance with a change in pen pressure. Thus, the position detector detects the change (phase change) in resonance frequency, thereby additionally detecting the pen pressure applied to the position indicator. The existing position indicator is constructed in such a manner.

However, the position indicator described in Patent Document 1 involves such a problem that, due to its construction, a certain amount of axial stroke of the core body is generated and also a change width of the resonance frequency cannot be made sufficiently large. For the purpose of solving this problem, the applicant of this application has proposed a position indicator using a variable capacitor whose capacitance is changed in accordance with a pen pressure applied to a core body in Japanese Patent Laid-Open Nos. Hei 04-96212 and Hei 05-275283 (hereinafter referred to as Patent Documents 2 and 3, respectively), and Japanese Patent Application No. 2008-305556 (hereinafter referred to as "the previous application," published as Japanese Patent Laid-Open No. 2010-129920). In short, such position indicator has a configuration, in which a variable capacitor is provided in a resonance circuit of the position indicator, and a capacitance of the variable capacitor is changed in accordance with a pen pressure, thereby changing a resonance frequency of the resonance circuit.

Specifically, the position indicator described in Patent Document 2 uses a variable capacitor in which a first electrode is provided on one surface of a dielectric, and a second electrode is provided on the other surface of the dielectric through a spacer interposed between the dielectric and the second electrode. The second electrode can be pressed against the dielectric through an elastic body by a core (rod) body. In this case, the variable capacitor is constructed in such a way that the second electrode comes to contact the dielectric through the elastic body in accordance with the pressing force (the pen pressure) applied to the core body, and the capacitance of the variable capacitor is changed in correspondence with the contacting state. As a result, it is possible to solve the problem associated with the position indicator, described in Patent Document 1, in which the resonance frequency is changed in accordance with the change in inductance of the coil.

The position indicator described in Patent Document 3 uses a variable capacitor in which a first electrode is provided on one surface of a dielectric, and a second electrode made of a conductive rubber having both flexibility and elasticity is disposed on the other surface of the dielectric through a spacer interposed between the dielectric and second electrode. The variable capacitor is constructed in such a way that the second electrode made of the conductive rubber comes to contact the dielectric in accordance with the pressing force (the pen pressure) applied to the core body, and the capacitance of the variable capacitor is changed in accordance with the contacting state. In this case, since the second electrode is made of the conductive rubber having both the flexibility and the elasticity, it is possible to realize the position indicator from which a stable output value is obtained with a smaller pen pressure as compared with the position indicator described in Patent Document 2.

The invention described in the previous application, that is, Japanese Patent Application JP 2008-305556, uses a variable capacitor having a dielectric and first and second electrodes, similarly to each of the cases of Patent Document 1 and 2. However, the variable capacitor is constructed in such a way that a positional relationship between the dielectric and the second electrode can be reliably returned back to an initial state, thereby enhancing the durability. Specifically, a dielectric, a terminal member for biasing the dielectric, and a conductive member composing the second electrode are provided in a holder, wherein the conductive member and the terminal member are provided so as to sandwich the dielectric therebetween. Also, an elastic member is provided in a circumference of the conductive member for pressing the conductive member away from the dielectric. The conductive member is pressed in the direction of the dielectric when the pressing force is applied to the core body.

As described above, the applicant of this application has made various inventions directed to a position indicator used together with a tablet in consideration of various factors, such as its use or application and the durability. It is to be noted that the inventions of Patent Documents 1 to 3 and the previous application have their respective unique features and, thus, are applied in the position indicators which are widely supported by end users.

SUMMARY OF THE INVENTION

The variable capacitors of the inventions described in Patent Documents 2 and 3 and the previous application have the unique characteristics as shown in graphs of pen pressure characteristics of FIGS. 20 to 22. FIG. 20 shows the pen pressure characteristics of the position indicator using the variable capacitor described in Patent Document 2. FIG. 21 shows the pen pressure characteristics of the position indicator using the variable capacitor described in Patent Document 3. FIG. 22 shows the pen pressure characteristics of the position indicator using the variable capacitor of the invention described in the previous application.

FIGS. 20 to 22 are graphs each showing a relationship between a pressing force applied to corresponding one of the variable capacitors, and an output value. In each of FIGS. 20 to 22, an axis of abscissa represents a magnitude of the pressing force, and a unit of the magnitude of the pressing force is gram-weight. Also, an axis of ordinate represents the output value from the variable capacitor. As also described above, the output value from the variable capacitor represents a phase, when a change in resonance frequency of the variable capacitor is detected as a change in the phase angle of an induced voltage, and a unit thereof is a degree. That is to say, as disclosed in Patent Document 1, the change of the capacitance value of each of the variable capacitors described above is outputted as a phase shift of an electric wave that is reflected from the resonance.

In addition, in each of FIGS. 20 to 22, a lower side graph, as indicated by an upward arrow, represents a relationship between the pressing force and the output value when the pressing force is gradually increased. On the other hand, an upper side graph, as indicated by a downward arrow, represents a relationship between the pressing force and the output value when the pressing force applied up to 500 gram-weight is gradually decreased.

As shown in FIGS. 20 to 22, each of the output values from the variable capacitors described in Patent Documents 2 and 3 and the previous application is logarithmically changed. That is, although the change in output value is linear while the value of the pressing force is small, in a region in which the pressing force is large, an increase in output value peaks out. This result is caused by the characteristics of the resonance circuit, and is not artificially achieved. However, this result is advantageous in providing suitable man-machine interface in view of the research result that the human's five senses including the tactile sense are logarithmic, and as such provides an easy-to-use stylus pen.

When the pen pressure characteristics shown in FIGS. 20 to 22 are compared with one another, one can discern that each has unique pen pressure characteristics. In the case of the pen pressure characteristics of the hard-type variable capacitor shown in FIG. 20, a rising (initial) load is slightly heavy as 30 gram-weight, and the swelling of the curve (pen pressure curve) of the pen pressure characteristics is moderate, while the hysteresis is relatively small. Here, the hysteresis means that when the other amount (a phase in this case) is changed along with the change in certain amount (a pressing force in this case), the other amount (phase) for the same certain amount (the pressing force) differs depending on paths (a path along which the pressing force is gradually increased, and a path along which the increased pressing force is gradually decreased) of the change of the certain amount (the pressing force).

In the case of the pen pressure characteristics of the soft-type variable capacitor shown in FIG. 21, while the rising load is smaller as about 10 gram-weight than that in the hard-type variable capacitor, the swelling and the hysteresis of the pen pressure curve are both large. Lastly, in the case of the small variable capacitor shown in FIG. 22, while the rising load is very small as about 1 gram-weight, the swelling of the pen pressure curve is large, and the hysteresis is moderate.

As described above, the fact that the change in output value (phase) corresponding to the pressing force is logarithmic is not disadvantageous from the viewpoint of man-machine interface. However, for the purpose of allowing information to be more precisely inputted, preferably, the change in output value (phase) corresponding to the pressing force should be more linear. In addition, by making the rising load as small as possible while also making the hysteresis small, it becomes possible to make the inputting of the information to further agree with a user's operation. Thus, for the variable capacitor applied in the position indicator used together with a tablet, it is desirable to have the characteristics such that the rising load is small, the change in output value (phase) corresponding to the pressing force is more linear, and the hysteresis is small as much as possible.

The inventors of the present application have investigated a change in contact area between the dielectric and the second electrode of the variable capacitor as described in Patent Document 2, in which the change of output value (phase) in accordance with the pressing force is moderate, and the hysteresis is relatively small. FIG. 23 is a diagram explaining the change in contact area between the dielectric and the second electrode of the variable capacitor.

As shown in FIG. 23, when the pressing force (load) is applied to the second electrode against the dielectric side, the second electrode and the dielectric come in contact with each other. Also, when the pressing force against the second electrode is in the range of 0 gram-weight to 50 gram-weight, the contact area between the second electrode and the dielectric relatively increases rather significantly. However, when the pressing force against the second electrode exceeds 50 gram-weight, the contact area between the second electrode and the dielectric increases only slightly. That is to say, when the pressing force against the second electrode is in the range of 0 gram-weight to 50 gram-weight, the output value from the hard-type variable capacitor is linearly changed, whereas when the pressing force exceeds 50 gram-weight, the output value from the hard-type variable capacitor peaks out.

FIG. 24 is a calculation formula of a capacitance of a capacitor, and FIGS. 25A and 25B are graphs obtained by calculating the capacitance of the variable capacitor, described in Patent Document 2, in accordance with the calculation formula shown in FIG. 24. In this case, the contact area (the electrode area A) between the second electrode and the dielectric, as shown in FIG. 25B, is changed in accordance with the pressing force. That is, as also shown in FIG. 23, when the pressing force is in the range of 0 gram-weight to 50 gram-weight, the contact area is rather significantly changed. However, when the pressing force exceeds 50 gram-weight, the spreading of the contact area is gradually decreased, and thus an increase rate is also decreased. Since the contact area between the second electrode and the dielectric peaks out as the applied pressing force is gradually increased, as shown in FIG. 25A, the capacitance of the variable capacitor has the non-linear characteristics.

Considering the situation, the inventors have conceived that, if a construction can be obtained such that the contact area between the second electrode and the dielectric is made small at first, and thereafter the contact area is increased as the pressing force is increased, then it is possible to obtain a variable capacitor having the desired characteristics.

The present invention has been made based on the concept described above, and is directed to providing a variable capacitor in which a rising load is relatively small, and an output value corresponding to a pressing force applied by a user and a hysteresis have desirable characteristics, and a position detector utilizing the same.

According to an embodiment of the present invention, there is provided a variable capacitor including: a dielectric having a first surface and a second surface opposing the first surface; a first electrode disposed on the first surface of the dielectric; a second electrode disposed to face the second surface of the dielectric; and a pressing member configured to cause the second electrode and the dielectric to contact each other when a pressing force is applied thereto. The second electrode includes at least one electrode piece, which includes an abutting central portion, against which the pressing member transmits a pressing force applied thereto, and an extension portion that radially extends from the abutting central portion toward a circumferential portion of the dielectric. The variable capacitor is configured such that a contact area between the dielectric and the second electrode is changed in accordance with a pressing force applied to the pressing member, to thereby change a capacitance of the variable capacitor.

According to the variable capacitor of the embodiment of the present invention, the first electrode is disposed on the first surface of the dielectric, and the second electrode is disposed so as to face the second surface of the dielectric. Thus, when the second electrode is pressed toward the dielectric side through the pressing member, the second electrode contacts the dielectric.

As described above, the second electrode includes the abutting central portion, which initially contacts the dielectric, and the extension portion that radially extends from the abutting central portion and that increasingly contacts the dielectric as an increasing amount of the pressing force is applied to the pressing member. As a result, when the second electrode is pressed through the pressing member, the contact area between the second surface of the dielectric and the second electrode is initially small, and is generally linearly increased as the pressing force is increased.

According to another embodiment of the present invention, there is provided a variable capacitor including: a dielectric having a first surface and a second surface opposing the first surface; a first electrode disposed on the first surface of the dielectric; a second electrode disposed so as to face the second surface of the dielectric; and a pressing member configured to cause the second electrode and the dielectric to contact each other when a pressing force is applied thereto. In this embodiment, the second surface of the dielectric includes a masked portion having a smaller permittivity than that of the dielectric and an un-masked portion exposing the dielectric therethrough. The un-masked portion includes an abutting central portion and an extension portion that radially extends from said abutting central portion toward a circumferential portion of the dielectric. The variable capacitor is configured such that a contact area between the dielectric and the second electrode is changed in accordance with a pressing force applied to the pressing member, to change a capacitance of the variable capacitor. The operation and effect of the variable capacitor of the second embodiment is similar to those of the variable capacitor of the first embodiment.

According to various embodiments of the present invention, a variable capacitor is realized in which the rising load is small, while the output value corresponding to the applied pressing force and the hysteresis have desired characteristics.

According to still another embodiment of the present invention, there is provided a position indicator including a resonance circuit having the variable capacitor constructed in accordance with various embodiments of the present invention.

According to a further embodiment of the present invention, there is provided a position indicator including a variable capacitor constructed in accordance with various embodiments of the present invention and a pen-shaped case. The variable capacitor is disposed in the pen-shaped case such that a direction along which a pressing force is applied to and through the pressing member coincides with a longitudinal direction of the pen case. Further, a distal tip of the pressing member protrudes from said pen case to form a pen tip.

When a variable capacitor of the present invention is applied to a position indicator, it is possible to realize a position indicator which can output information that closely corresponds with the use's operation (movement) of the position indicator, and to which the information can be more precisely inputted.

BRIEF DESCRIPTION OF THE DRAWINGS

FIG. 4 is a view explaining an example of a shape of a second electrode in the variable capacitor of the first embodiment shown in FIG. 2;

DETAILED DESCRIPTION OF THE PREFERRED EMBODIMENTS

The preferred embodiments of the present invention will be described in detail hereinafter with reference to the accompanying drawings. Hereinafter, firstly, description will be given with respect to an input device composed of a position detector, and a position indicator according to the present invention. After that, description will be given with respect to four different embodiments of a variable capacitor of the present invention which is applied to the preferred embodiments of the position indicator of the present invention, respectively.

[Input Device]

Figure 1:
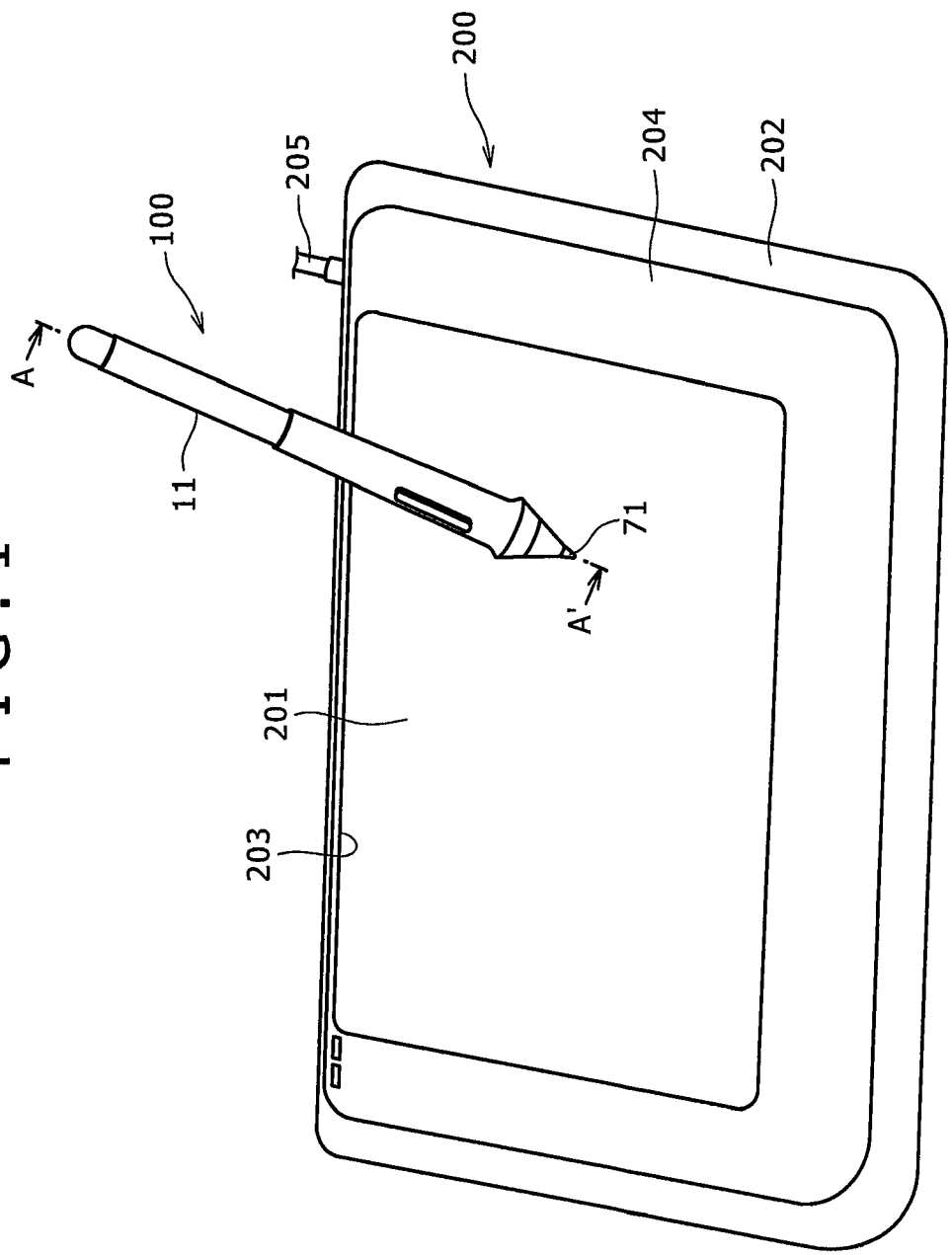
FIG. 1 is a perspective view explaining an external appearance of an input device in which a position indicator of a first embodiment of the present invention is used.

Firstly, description will be given with respect to an input device constructed by using a position indicator of the present invention. FIG. 1 is a perspective view explaining a schematic construction of the input device. As shown in FIG. 1, the input device according to a first embodiment is composed of the position indicator 100 and the position detector 200.

[Position Detector]

The position detector 200 is connected to an external apparatus such as a personal computer or a Personal Digital Assistant (PDA) via a cable 205, whereby the position detector 200 is used as an input device for such an external apparatus. It is to be noted that although not illustrated, such a position detector 200 may be built in the personal computer or the like.

The position detector 200 is composed of a detecting portion 201 and a chassis 202. In this case, the detecting portion 201 detects a position indicated by the position indicator 100, which will be described later. The chassis 202 forms a hollow thin rectangular parallelepiped and has the detecting portion 201. The chassis 202 has an upper chassis 204 and a lower chassis (not shown). In this case, the upper chassis 204 has an opening portion 203 for exposing a detecting surface of the detecting portion 201. The upper chassis 204 is superposed on the lower chassis.

The detecting portion 201 is fitted to the quadrangular opening portion 203 of the upper chassis 204, so that the detecting surface of the detecting portion 201 is exposed through the quadrangular opening portion 203. A plurality of loop coils for transmitting/receiving an electric wave and a necessary circuit portion are mounted inside of the chassis 202. The position detector 200 having such a construction receives an input of characters, figures or the like made by a user's pointing operation of the position indicator 100, which will be described later.

[Position Indicator]

The position indicator 100 of the first embodiment, as shown in FIG. 1, is formed so as to be of a pen type. Briefly, the position indicator 100 includes a case 11, which houses therein a core (rod) body 71, as well as a position indicating coil, a variable capacitor, a printed wiring board, and the like for the core body 71. In this case, one tip portion of the core body 71 protrudes from the case 11.

As the principles are explained in detail in Patent Document 1 described above, for example, an electric wave is transmitted between the position detector 200 having the tablet construction and the position indicator 100 having the pen-type construction, as shown in FIG. 1. As a result, a position indicated by the position indicator 100 can be detected on the position detector 200 side, and a usage state of the position indicator 100 can also be detected on the position detector 200 side. Also, these detection results can be supplied to the external apparatus such as the personal computer.

[Variable Capacitor of the First Embodiment]

Next, description will be given with respect to a first embodiment of the variable capacitor of the present invention used in the position indicator of the present invention. The variable capacitor of the first embodiment is realized by the following technique used in the variable capacitor disclosed in Patent Document 2 described above, and by further improving that technique.

Figure 2:
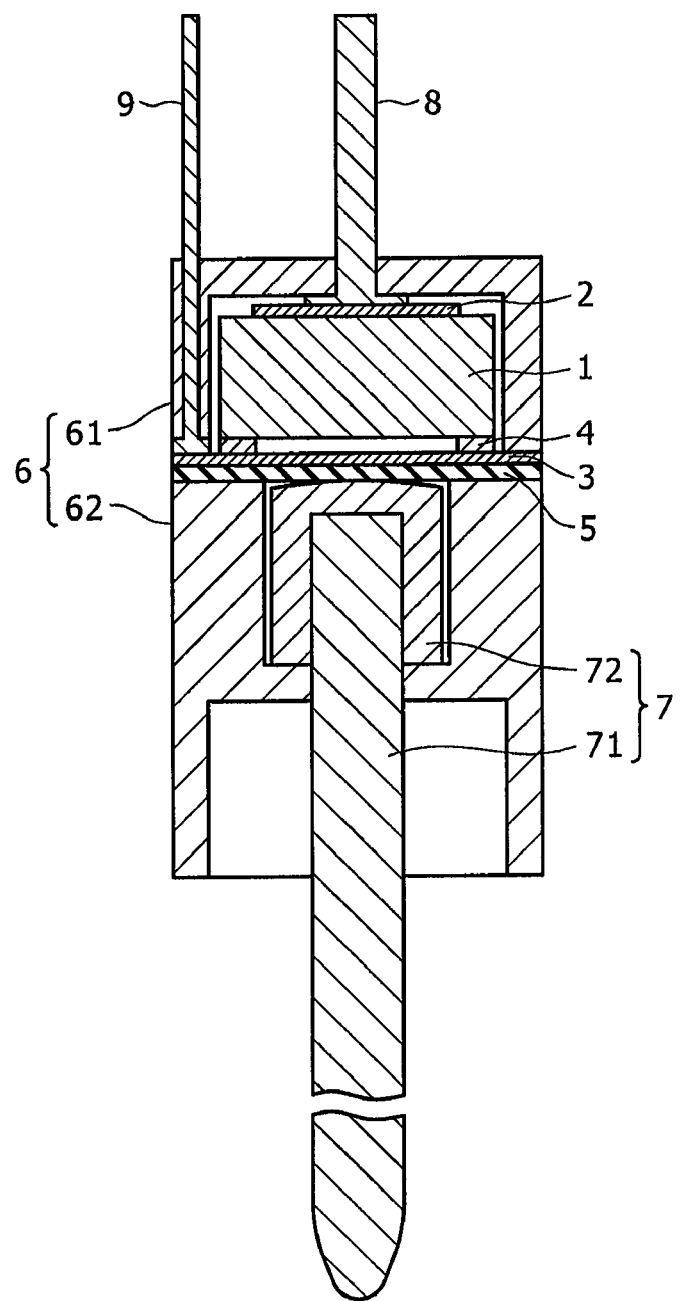
FIG. 2 is a cross sectional view explaining a variable capacitor of a first embodiment of the present invention.

FIG. 2 is a cross sectional view showing a construction of the variable capacitor of the first embodiment. In FIG. 2, reference numeral 1 designates a dielectric, reference numeral 2 designates a first electrode, reference numeral 3 designates a second electrode, reference numeral 4 designates a spacer, reference numeral 5 designates an elastic body, reference numeral 6 designates a housing, reference numeral 7 designates a pressing body, and reference numerals 8 and 9 designate terminals, respectively.

Figure 3:
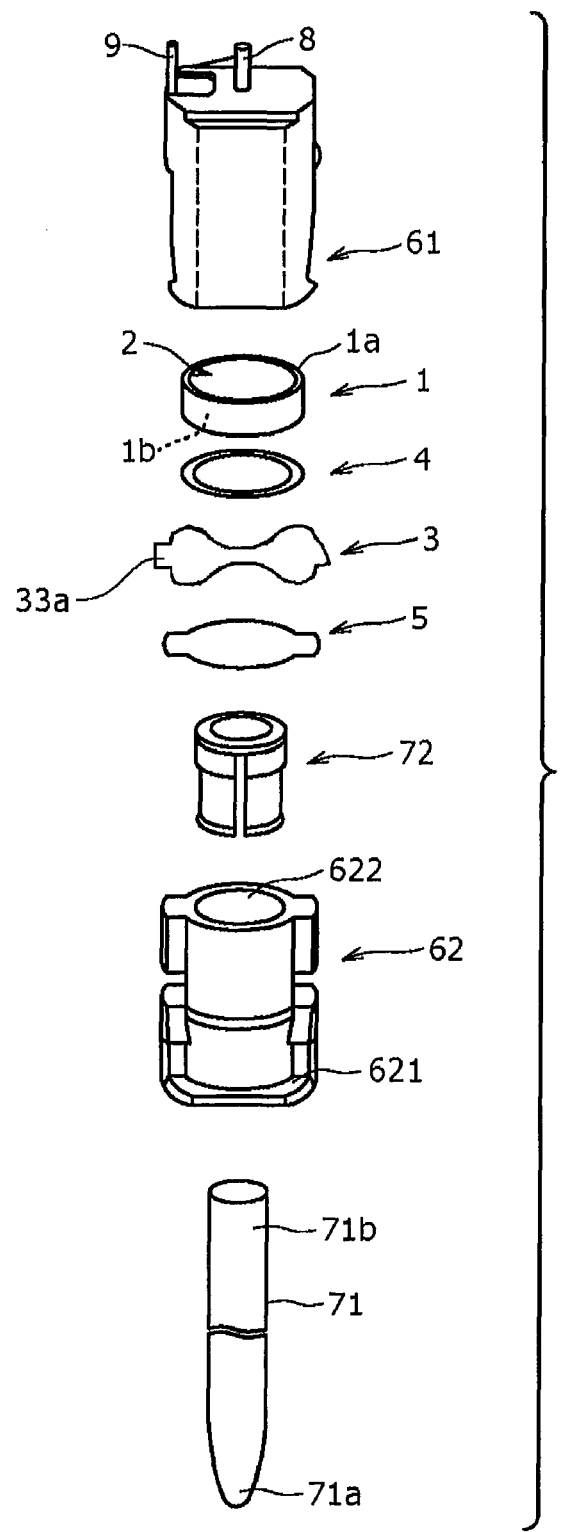
FIG. 3 is an exploded perspective view explaining main members composing the variable capacitor of the first embodiment shown in FIG. 2.

FIG. 3 is an exploded perspective view showing shapes of main members composing the variable capacitor of the first embodiment. As shown in FIGS. 2 and 3, the variable capacitor of the first embodiment is formed in the housing 6. In this case, the housing 6 is composed of a first housing member 61, and a second housing member 62 which is inserted from a lower side into the first housing member 61. As shown in FIGS. 2 and 3, the first electrode 2, the dielectric 1, the spacer 4, the second electrode 3, and the elastic body 5 are laminated in this order. The pressing body 7 composed of a core body 71 and a cap body 72 is configured to press the second electrode 3 against the dielectric 1 side through the elastic body 5.

The dielectric 1 is made of an approximately disc-like hard material having two surfaces 1$a$ and 1$b$ that are parallel with each other. In this case, a ceramics which is 2 mm in thickness, 4.6 mm in diameter, and 7,000 in relative permittivity is used as the material for the dielectric 1. In FIGS. 2 and 3, the first electrode 2 is provided on a side of the surface 1a that is an upper surface of the dielectric 1, and the second electrode 3 is provided on a side of the surface 1b that is a lower surface of the dielectric 1.

The first electrode 2 is made of an approximately disc-like silver plate which is 0.2 mm in thickness and 4.0 mm in diameter, and sintered to be mounted to one surface 1a of the dielectric 1. The second electrode 3 is obtained by evaporating a Nichrome film having a thickness of 1,000 Å on an insulating film having flexibility, that is, a polyimide film having a thickness of 75 μm in this case.

The spacer 4 is made of a polyimide film which is 40 μm in thickness and 3.5 in relative permittivity. Also, the spacer 4 is formed into a ring-like shape which is 4.6 mm in outer diameter and is 3.3 mm in inner diameter. The elastic body 5 is made of a silicon rubber having a thickness of 0.35 mm, and is composed of a disc-like main body portion having a diameter of 4.6 mm, and engaging portions which extend in a tongue-like shape from two positions opposite from each other in a diameter direction of the main body portion. It is to be noted that the surface 1b facing the second electrode 3 of the dielectric 1 is subjected to smooth polish finishing so that a surface precision thereof becomes Ra=0.1 μm or less.

The housing 6, as described above, is composed of the first housing member 61 and the second housing member 62 each of which is made of a synthetic resin having high rigidity, that is, polyamide having a glass fiber contained therein in the first embodiment. As shown in FIG. 3, the first housing member 61 has an approximately cylindrical shape having a closed end.

The second housing member 62 is formed into an approximately columnar shape which can be accommodated inside the first housing member 61. In this case, an annular flange body 621 having the same diameter as that of the first housing member 61 is provided integrally with one end in an axial direction of the second housing member 62. In addition, as shown in FIG. 3, the second housing member 62 is provided with a through hole 622 which completely extends in the axial direction of the second housing member 62 through the second housing member 62. It is to be noted that the outer diameter of the second housing member 62 is the same as that of each of the dielectric 1, the electrode portion of the second electrode 3, the spacer 4, and the elastic body 5.

As also described above, the pressing body 7 is composed of the core body 71 and the cap body 72. In this case, the core body 71 and the cap body 72 are made of a hard material and a material having high rigidity, that is, a ceramics and polyamide having a glass fiber contained therein, respectively. The core body 71 has an outer diameter which is slightly smaller than an inner diameter of the through hole 622 of the second housing member 62 shown in FIG. 3. Also, one end 71a of the core body 71 is formed into a hemispherical shape.

The cap body 72 has an inner diameter which is slightly smaller than the outer diameter of the through hole 622 of the second housing member 62, and has an inner diameter which is slightly smaller than the outer diameter of the core body 71. An axial length of the cap body 72 is shorter than a length of the second housing member 62, and the cap body 72 is formed into an approximately cylindrical shape having a closed end. The terminal 8 is connected to the first electrode 2, and the terminal 9 is connected to the second electrode 3. These terminals 8 and 9 are obtained, for example, by plating brass with nickel and gold, respectively.

Next, description will be given with respect to how to assemble the variable capacitor of the first embodiment. Firstly, as shown in FIGS. 2 and 3, the terminals 8 and 9 are inserted from the upper portion of the first housing member 61 to be mounted thereto. Next, the dielectric 1 having one surface 1a to which the first electrode 2 is sintered to be mounted, the spacer 4, the second electrode 3, and the elastic body 5 are layered (or laminated) in this order to be accommodated inside the first housing member 61. In this case, the terminal 8 is in contact with (connected to) one surface 1a side of the dielectric 1, that is, with the first electrode 2. The second electrode 3 is disposed in such a way that when the second electrode 3 is pressed by the pressing body 7 as will be described later, the evaporation surface side of the second electrode 3 contacts the other surface 1b of the dielectric 1 through the spacer 4. In addition, the terminal 9 is in contact with (connected to) a terminal portion 33a of the second electrode 3.

Next, after the cap body 72 is accommodated in the through hole 622 of the second housing member 62, the second housing member 62 is fitted from the lower side of the first housing member 61 into the second housing member 62. In this connection, a cut or a recess portion and a corresponding project portion are provided in predetermined positions, respectively, and are engaged with each other, whereby the first housing member 61 and the second housing member 62 are fixed to each other. It is to be noted that sizes of the respective portions of the first housing member 61 and the second housing member 62 are set so that in this state, predetermined forces are applied between the parts or components, especially, between the first electrode 2 and the terminal 8, and between the second electrode 3 and the terminal 9.

Finally, the other end 71b of the core body 71 is inserted into the inside of the cap body 72, which is accommodated through the through hole 622 of the second housing member 62, to be fixed thereto. It is to be noted that the core body 71 and the cap body 72 may be first combined with each other, and then may be accommodated in the second housing member 62, and thereafter the second housing member 62 may be fitted into the first housing member 61.

As a result, the first electrode 2 and the second electrode 3 are disposed on both sides of the dielectric 1 and the spacer 4, respectively, in the housing 6 so as to sandwich the dielectric 1 and the spacer 4 between them. Thus, a capacitor is formed by the dielectric 1, the spacer 4, the first electrode 2, and the second electrode 3. Also, the second electrode 3 is disposed so as to face the other surface 1b of the dielectric 1 through the spacer 4. Therefore, a contact area between the other surface 1b of the dielectric 1 and the second electrode 3 is changed in accordance with a pressing force applied through the pressing portion 7, thereby realizing the variable capacitor.

The basic construction described above of the variable capacitor of the first embodiment is the same as that of the variable capacitor disclosed in Patent Document 2 described above. However, in the variable capacitor of the first embodiment, the shape of the second electrode 3 is completely different from that of the variable capacitor disclosed in Patent Document 2.

FIG. 4 shows an example of the shape of the second electrode 3 of the variable capacitor of the first embodiment. As shown in FIG. 4, the second electrode 3 of the variable capacitor of the first embodiment is composed of a central portion 31, extension portions 32a and 32b, and terminal portions 33a and 33a. In this case, the central portion 31 includes a center O and has a predetermined area. The extension portions 32a and 32b extend from the central portion 31 so as to sandwich the central portion 31 between them. Also, the terminal portions 33a and 33b are provided in end portions of the extension portions 32a and 32b, respectively.

The central portion 31 is a portion which firstly contacts the other surface 1b of the dielectric 1 when the pressing force is applied to the second electrode 3 through the pressing body 7. In other words, the central portion 31 is an abutting central portion, against which the pressing body 7 transmits a pressing force applied thereto, such that the central portion 31 abuts the other surface 1b of the dielectric 1. In the case of the example shown in FIG. 4, the central portion 31 can be defined as a circular portion enclosed in a circle indicated by a dotted line, including the center O and having a central length (diameter) of D passing through the center O. It is to be noted that the central length D can be variously selected.

The extension portions 32a and 32b are portions which extend in a radial direction of the central portion 31 (in an x-axis direction in FIG. 4) from the central portion 31 having the center O, and come to contact the other surface 1b of the dielectric 1 in accordance with the pressing force. A length L of the extension portions in a direction orthogonal to the radial direction generally becomes longer as the distance from the central portion 31 increases. It is to be noted that in the case of the example shown in FIG. 4, the second electrode 3 is formed in such a way that, except for the terminal points 33a and 33a, upper and lower portions with the x-axis as a center are line-symmetric, and right-hand and left-hand side portions with the y-axis as a center are line-symmetric.

It is to be noted that the terminal portion 33a on the extension portion 32a side is a portion which becomes a connection portion to the terminal 9 described above, and is used to engage the second electrode 3 with the inside of the housing 6. The terminal portion 33a on the extension portion 32b side is a portion which is used to engage the second electrode 3 with the inside of the housing 6. It should be noted that the reason that the two terminal portions 33a and 33a are different in shape from each other is so that the front and back of the second electrode 3 can be easily distinguished, to prevent the inconvenience such as a mistake in the layered (or lamination) state.

As described above, in the variable capacitor of the first embodiment, approximately fan-like cuts are provided in the second electrode 3, which had a circular shape in the prior art. Thus, as shown in FIG. 4, the second electrode 3 has a shape resembling butterfly wings. When the pressing force is applied to the second electrode 3 through the pressing portion 7, firstly, the central portion 31 contacts the other surface 1b of the dielectric 1, and as the pressing force is further increased, the portion of the second electrode 3 contacting the other surface 1b of the dielectric 1 spreads toward the extension portions 32a and 32b of the second electrode 3.

Figure 5A:
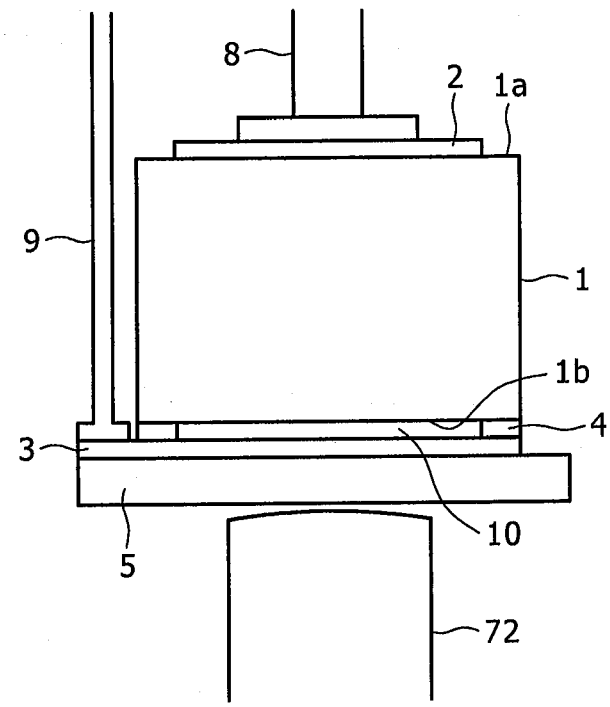
FIGS. 5A and 5B are views explaining an operation of the variable capacitor of the first embodiment shown in FIG. 2, respectively.
Figure 5B:
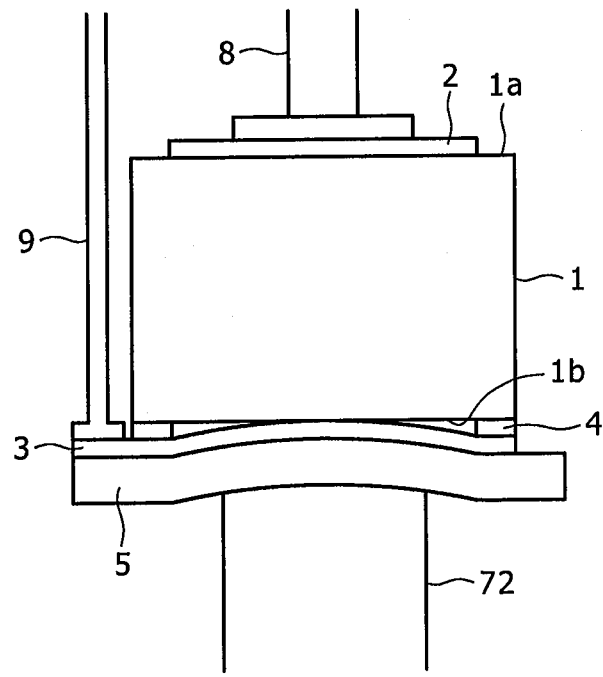

FIGS. 5A and 5B are views explaining an operation of the variable capacitor of the first embodiment. In the variable capacitor of the first embodiment, in a state in which no pressure (no displacement) is applied to the core body 71 of the pressing portion 7 (in an initial state), the other surface 1b of the dielectric 1, and the second electrode 3 are separated by a distance corresponding to a thickness of the spacer 4 from each other, except for a peripheral portion of the other surface 1b of the dielectric 1 as shown in FIG. 5A. Thus, an air layer 10 is defined between the other surface 1b of the dielectric 1 and the second electrode 3. Therefore, a capacitance value (initial capacitance value) detected between the terminals 8 and 9 at this time is approximately a serial composite capacitance of a capacitance based on the dielectric 1 and a capacitance based on the air layer 10 having a relative permittivity of 1.0, and thus is rather small.

On the other hand, when a pressure (or a displacement) is applied to the core body 71, the cap body 72 of the pressing portion 7 bends (curves) the second electrode 3 toward the dielectric 1 side through the elastic body 5, and the thickness of the air layer 10 becomes smaller than that of the spacer 4.

At this time, the capacitance based on the air layer 10 is increased in inverse proportion to the thickness of the air layer 10, and thus the capacitance value detected between the terminals 8 and 9 correspondingly increases.

After that, as the pressure (or the displacement) applied to the core body 71 is increased, as shown in FIG. 5B, the second electrode 3 eventually contacts the other surface 1b of the dielectric 1. Then, only the capacitance based on the dielectric 1 is obtained in the contact portion, and the capacitance value detected between the terminals 8 and 9 is increased approximately in proportion to the contact area. Accordingly, in the case of the variable capacitor of the first embodiment, the capacitance value which is largely changed in a manner corresponding to the pressure or a very small displacement applied to one end of the pressing body 7 is taken out from the terminals 8 and 9.

In the case of the variable capacitor of the first embodiment, as shown in FIG. 4, the shape of the second electrode 3 is set such that the area of the central portion 31 is small, and each of the areas of the extension portions 32a and 32b becomes larger toward the outside. Therefore, the area of the second electrode 3 contacting the other surface 1b of the dielectric 1 becomes larger as the pressing force applied to the second electrode 3 is further increased.

In other words, unlike the variable capacitor described in Patent Document 2 explained with reference to FIG. 23 to FIGS. 25A and 25B, the contact area between the dielectric 1 and the second electrode 3 increases substantially linearly, without peaking out as the pressing force is further increased. Therefore, in the case of the variable capacitor of the first embodiment, with regard to the phase-load characteristics as well, it is possible to prevent the change in phase from peaking out in accordance with the increase in load.

Figure 6:
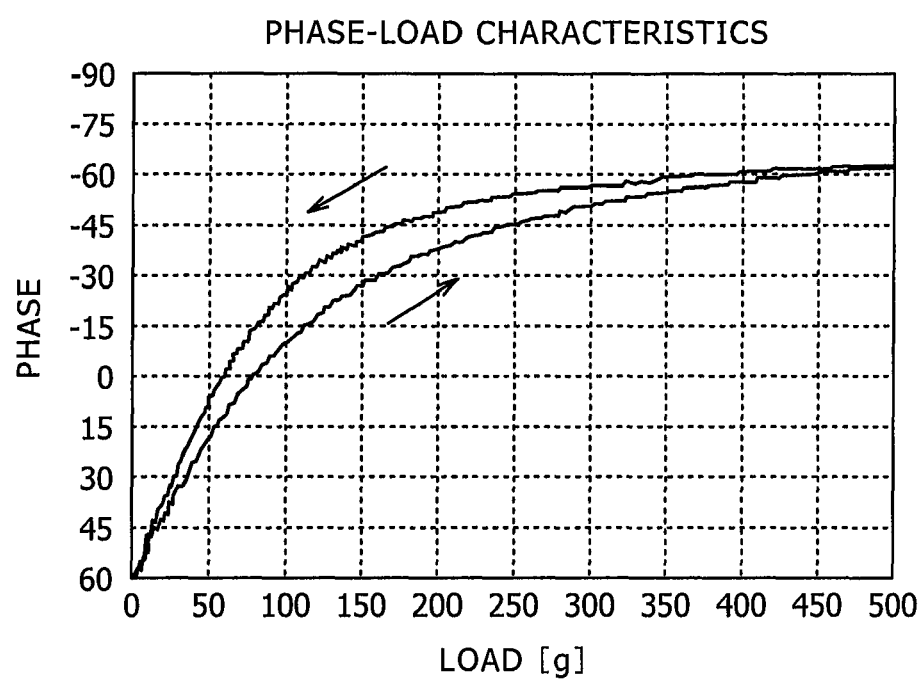
FIG. 6 is a graph representing phase-load characteristics of the variable capacitor of the first embodiment shown in FIG. 2.
Figure 20:
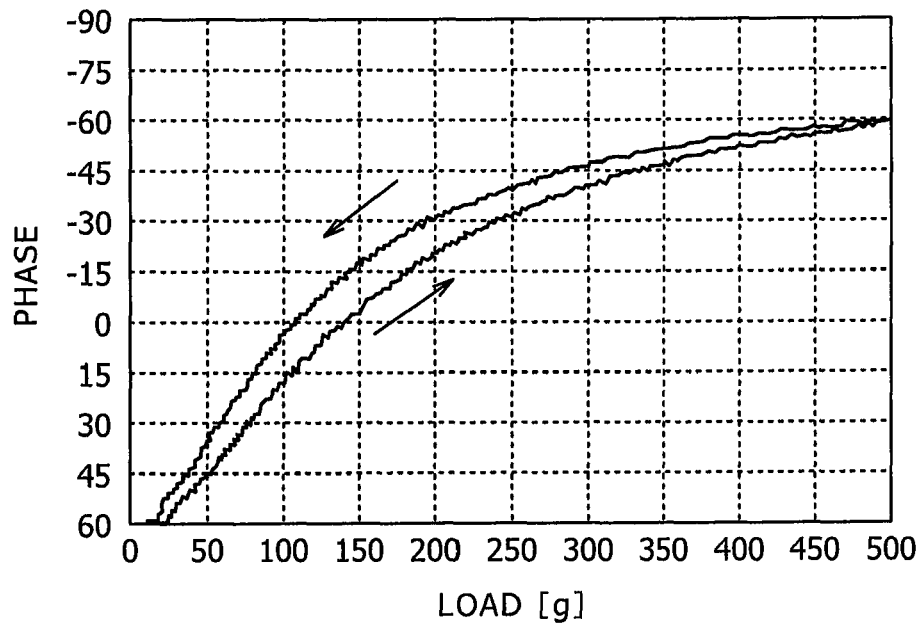
FIG. 20 is a graph representing phase-load characteristics of a hard-type variable capacitor described in Patent Document 2.
Figure 21:
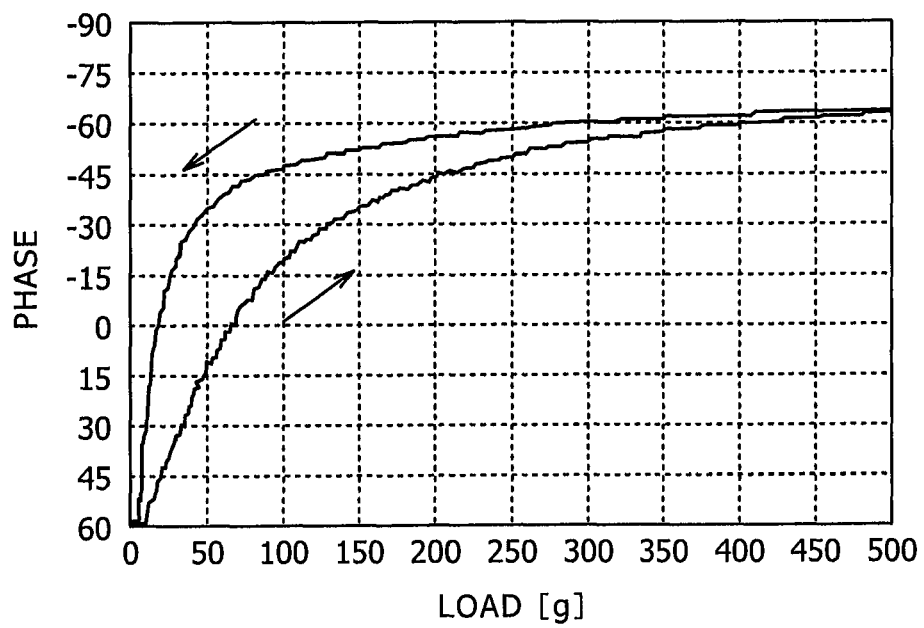
FIG. 21 is a graph representing phase-load characteristics of a soft-type variable capacitor described in Patent Document 3.
Figure 22:
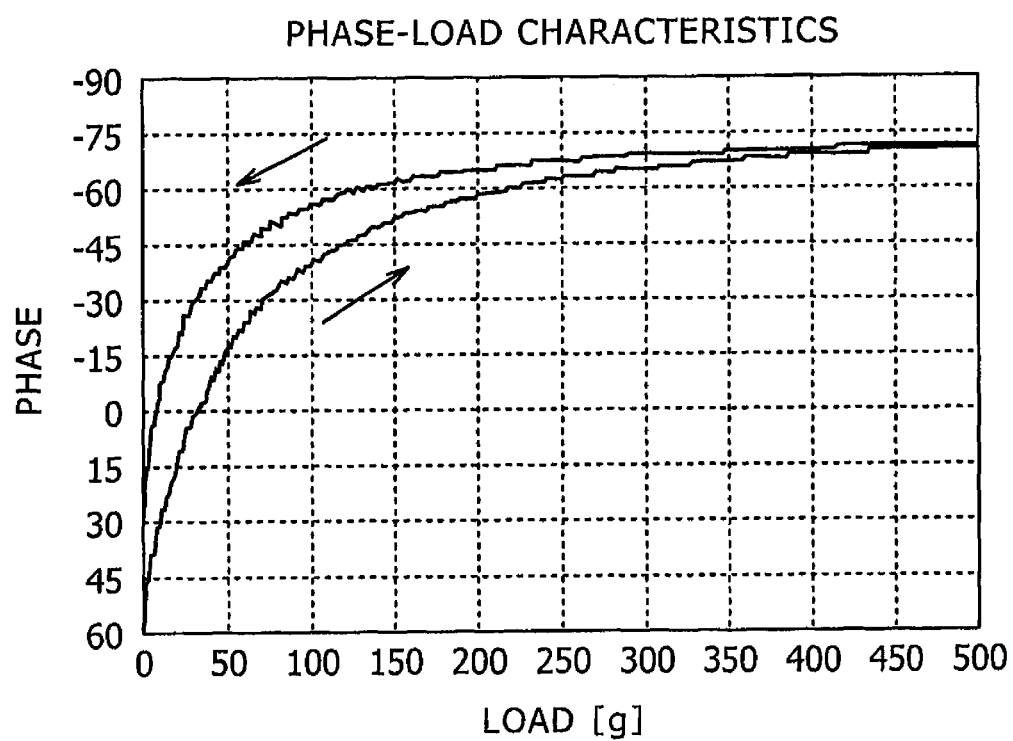
FIG. 22 is a graph representing phase-load characteristics of a small variable capacitor described in the previous application.
Figures 23, 24:
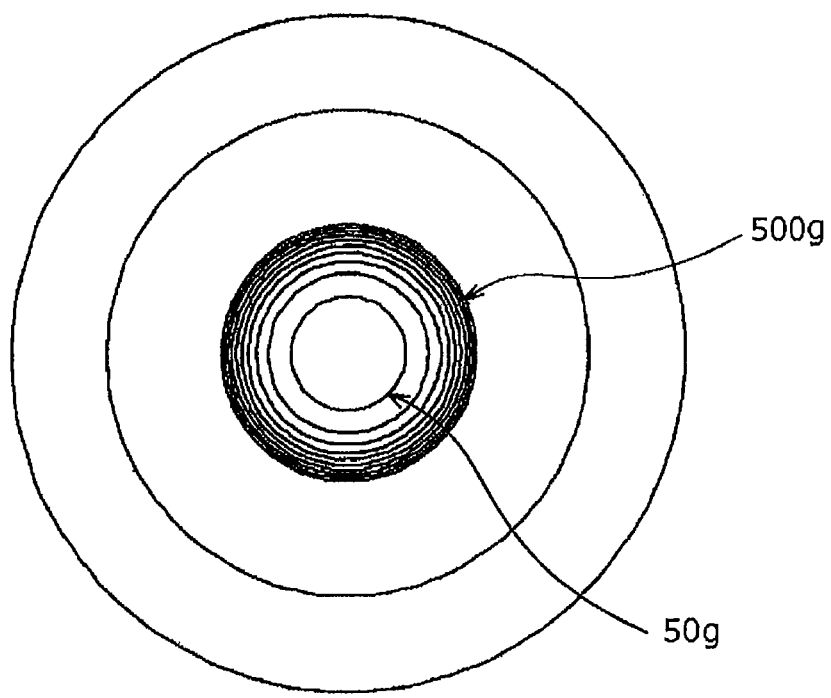
FIG. 23 is a view explaining a change in contact area between a dielectric and a second electrode in the hard-type variable capacitor described in Patent Document 2.
FIG. 24 is a diagram showing a calculation formula for a capacitance of a variable capacitor.
Figure 25A:
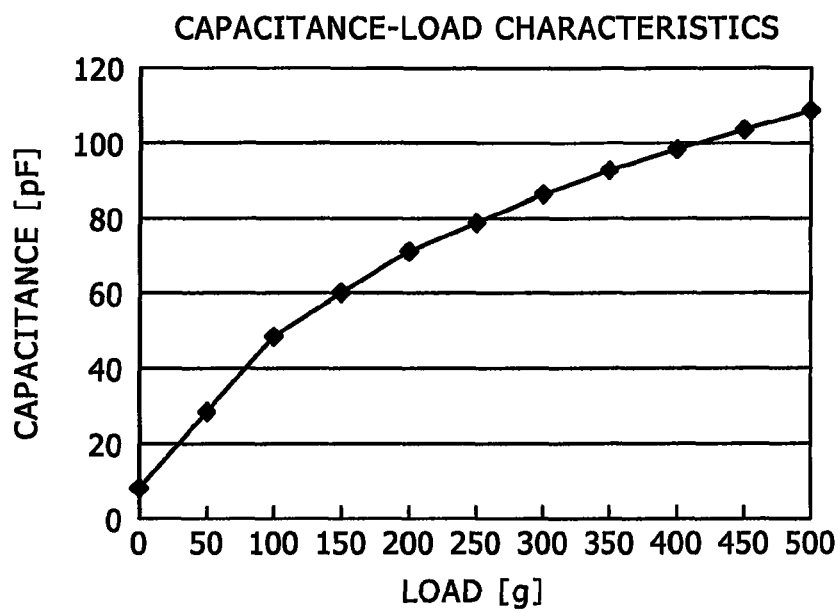
FIGS. 25A and 25B are graphs representing capacitance-load characteristics and area-load characteristics of the hard-type variable capacitor described in Patent Document 2, respectively.
Figure 25B:
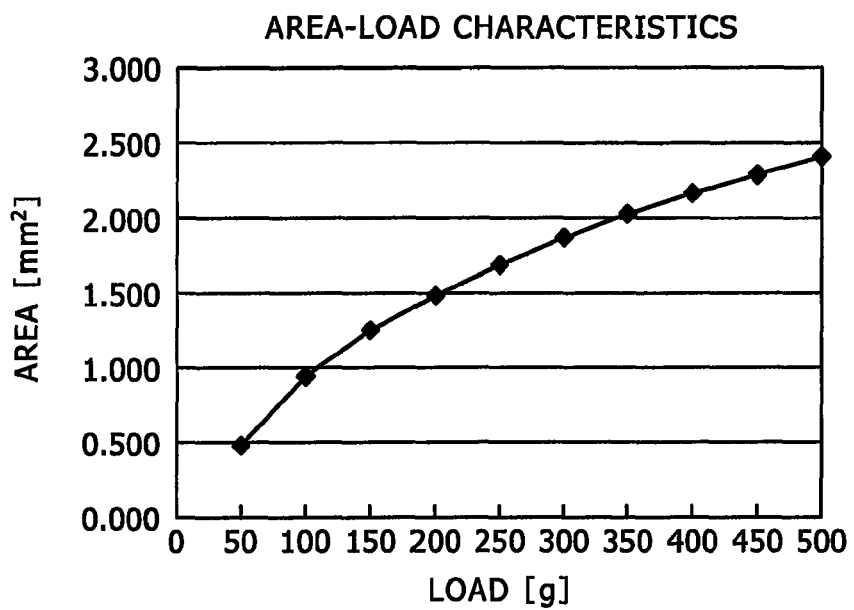

FIG. 6 is a graph representing phase-load characteristics of the variable capacitor of the first embodiment. When FIG. 6 is compared with FIGS. 20 to 22 representing the phase-load characteristics of the existing variable capacitor, the following matters become clear. In the case of the variable capacitor of the first embodiment, it is possible to realize such characteristics that the rising load is very small, the swelling of the phase-load characteristics (the so-called pen pressure characteristics) is very small, and the hysteresis is also relatively small. Thus, it is possible to realize such characteristics that the output value corresponding to the pressing force becomes substantially linear.

[Modifications to the Variable Capacitor of the First Embodiment]

The shape of the second electrode 3 in the variable capacitor of the first embodiment can be variously adjusted. FIGS. 7A to 7D are views explaining examples of adjustment to the shape of the second electrode 3. In FIGS. 7A to 7D, an x-axis and a y-axis represent axes which pass through the center O of the central portion 31 so as to be orthogonal to each other, respectively.

FIGS. 7A to 7D show four examples of the shape of the second electrode 3 when a diameter D of the central portion 31 and a maximum length L in a direction orthogonal to the direction (the x-axis direction in FIGS. 7A to 7D) of the central portion 31 between the extension portions 32a and 32b are adjusted, respectively.

Figure 7C:
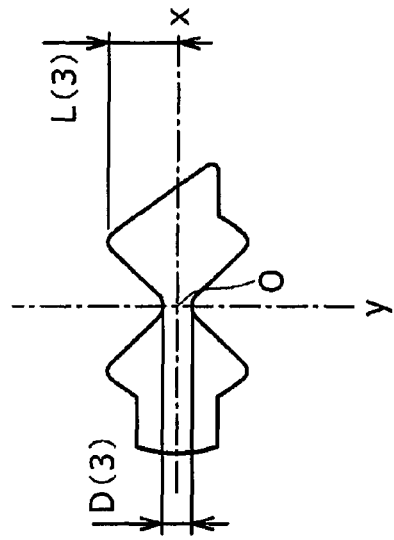
FIGS. 7A to 7D are views explaining examples of the shape of the second electrode of the variable capacitor shown in FIG. 2.
Figure 7D:
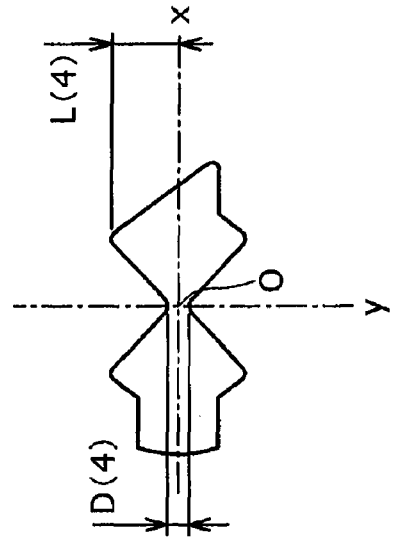
Figure 7A:
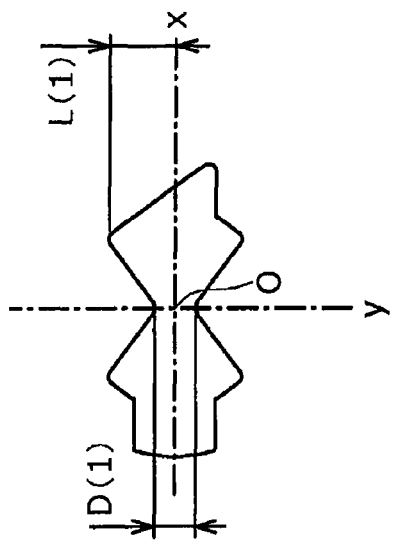

As can be seen by comparing FIGS. 7A, 7B, 7C, 7D with one another, the diameter of the central portion 31 is longest in the case of the shape shown in FIG. 7A, and is shortest in the case of the shape shown in FIG. 7D, as indicated by D(1)>D(2)>D(3)>D(4).

Figure 7B:
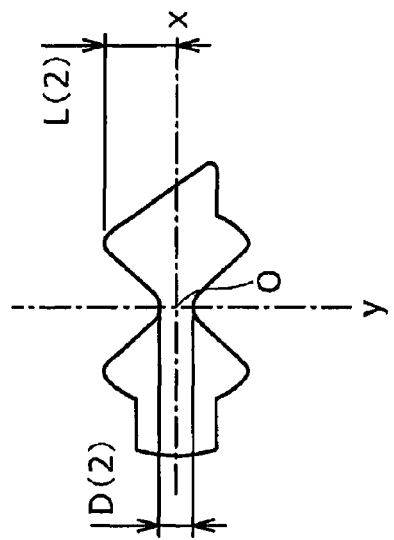

With regard to a maximum length in the direction orthogonal to the central portion 31 between the extension portions 32*a* and 32*b*, L(1) shown in FIG. 7A is identical to L(4) shown in FIG. 7D, but each of L(2) shown in FIGS. 7B and L(3) shown in FIG. 7C is longer than each of L(1) shown in FIGS. 7A and L(4) shown in FIG. 7D. It is to be noted that in the case of the four examples of FIGS. 7A to 7D, L(2)>L(3).

One or both of the diameter D of the central portion 31 and the maximum length L in the direction orthogonal to the radial direction of the central portion 31 between the extension portions 32*a* and 32*b* are adjusted in such a manner as to adjust the phase-load characteristics (pen pressure characteristics) of the variable capacitor of the first embodiment.

Figure 8C:
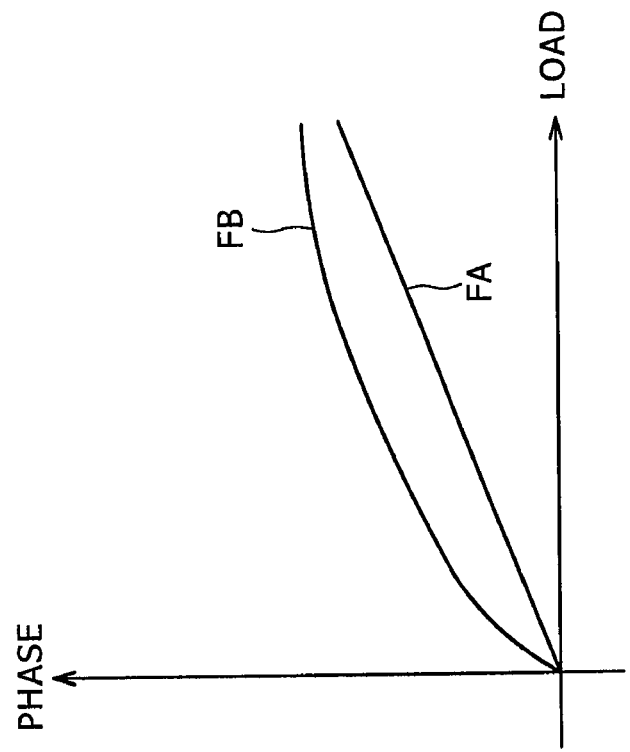
FIGS. 8A and 8B, and 8C are views and a graphical representation explaining a difference in output characteristics depending on a difference in width of a central portion of the second electrode of the variable capacitor shown in FIG. 2.
Figure 8A:
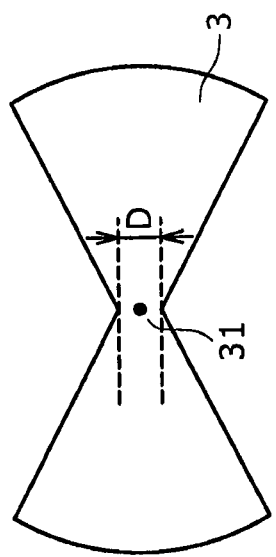
Figure 8B:
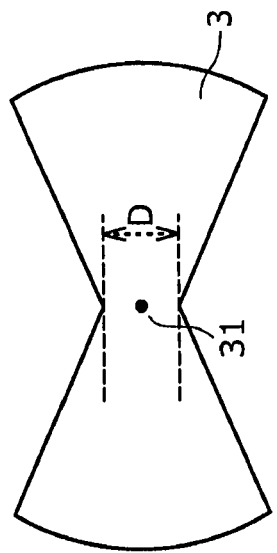

FIGS. 8A and 8B, and 8C are views and a graphical representation explaining the phase-load characteristics depending on the diameter D of the central portion 31, respectively. Also, FIGS. 9A to 9C, and 9D are views and a graphical representation explaining the phase-load characteristics depending on the maximum length L in the direction orthogonal to the radial direction (the x-axis direction in FIG. 9) of the central portion 31 between the extension portions 32*a* and 32*b*, respectively.

Firstly, description will be given with respect to the phase-load characteristics of the variable capacitors using the second electrodes 3 different in length of the diameter D of the central portion 31 from each other as shown in FIGS. 8A and 8B, respectively. In FIG. 8C, characteristics FA are the phase-load characteristics of the variable capacitor when the second electrode 3 having the small diameter D and shown in FIG. 8A is used. In FIG. 8C, characteristics FB are the phase-load characteristics of the variable capacitor when the second electrode 3 having the large diameter D and shown in FIG. 8B is used.

As can be seen by comparing the characteristics FA and the characteristics FB with each other, when the diameter D of the central portion 31 of the second electrode 3 is small as shown in FIG. 8A, the contact area between the second electrode 3 and the other surface 1*b* of the dielectric 1 at the time of the initial contact can be made small, and therefore, the contact area can be gradually increased. For this reason, as shown in the characteristics FA in FIG. 8C, the phase-load characteristics can be made linear.

On the other hand, when the diameter D of the central portion 31 of the second electrode 3 is large as shown in FIG. 8B, the contact area between the second electrode 3 and the other surface 1*b* of the dielectric 1 at the time of the initial contact is relatively large. For this reason, although the rising characteristic is good, the linearity is deteriorated as compared with the case of the phase-load characteristics FA when the second electrode 3 having the shape having the smaller diameter D is used. As has been described, the diameter D of the central portion 31 of the second electrode 3 is adjusted, thereby making it possible to mainly adjust the linearity of the phase-load characteristics.

Figure 9D:
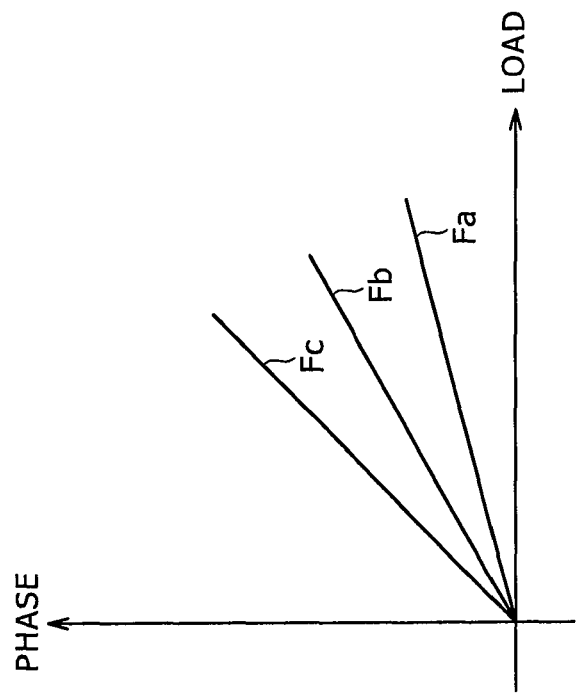
FIGS. 9A to 9C, and 9D are views and a graphical representation explaining a difference in output characteristics depending on a difference in width of an extension portion of the second electrode of the variable capacitor shown in FIG. 2.
Figure 9A:
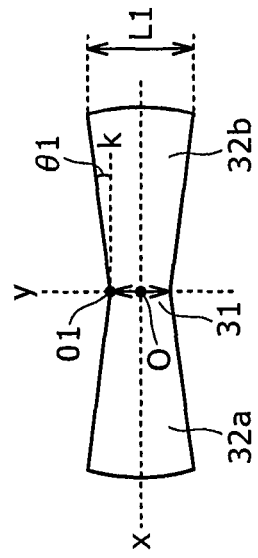
Figure 9B:
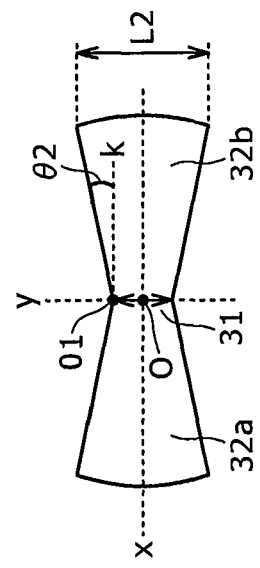
Figure 9C:
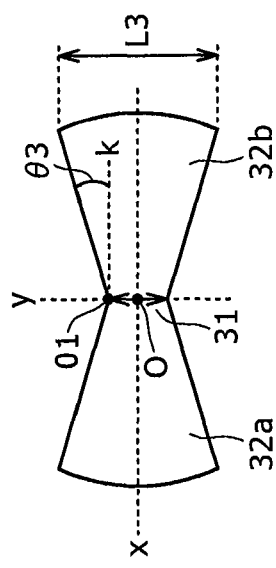

Next, description will be given with respect to the phase-load characteristics of the variable capacitors using the second electrodes 3 having the different maximum lengths L in the direction orthogonal to the radial direction (in the x-axis direction in FIGS. 9A to 9C) of the central portion 31 between the extension portions 32*a* and 32*b*, respectively, while the diameters D of the respective central portions are identical to one another as shown in FIGS. 9A, 9B and 9C. It is to be noted that when the maximum length L in the direction orthogonal to the radial direction between the extension portions 32*a* and 32*b* is increased without changing the diameter D of the central portion 31 as shown in FIGS. 9A, 9B and 9C, an angle θ between a straight line k passing through an end portion o1 of the diameter D of the central portion 31 so as to be parallel with the x-axis, and a side of each of the extension portions 32*a* and 32*b* also increases.

In FIG. 9D, characteristics Fa are the phase-load characteristics of the variable capacitor using the second electrode 3 having the shortest maximum length L and shown in FIG. 9A. In FIG. 9D, characteristics Fb are the phase-load characteristics of the variable capacitor using the second electrode 3 having the middle maximum length L and shown in FIG. 9B. Finally, in FIG. 9D, characteristics Fc are the phase-load characteristics of the variable capacitor using the second electrode 3 having the longest maximum length L and shown in FIG. 9C.

As can be seen by comparing the characteristics Fa, the characteristics Fb, and the characteristics Fc all shown in FIG. 9D, an inclination of the phase-load characteristics becomes larger as the maximum length L in the direction orthogonal to the radial direction of the central portion 31 between the extension portions 32*a* and 32*b* become longer. Here, as also described above, the radial direction of the central portion 31 is the x-axis direction in FIGS. 9A, 9B and 9C. Therefore, the maximum length L in the direction orthogonal to the radial direction of the central portion 31 between the extension portions 32*a* and 32*b* is adjusted so as to adjust the inclination of the phase-load characteristics.

It is to be noted that the adjustment of the maximum length L in the direction orthogonal to the radial direction of the central portion 31 between the extension portions 32*a* and 32*b* is equivalent to the adjustment of the angle θ between the straight line k passing through an end portion o1 of the diameter D of the central portion 31 so as to be parallel with the x-axis, and the side of each of the extension portions 32*a* and 32*b*. In this connection, each of the extension portions 32*a* and 32*b* has a fan-like shape. Therefore, when each of the extension portions 32*a* and 32*b* is seen as having the fan-like shape with the center O, the adjustment of the maximum length L in the direction orthogonal to the radial direction of the central portion 31 between the extension portions 32*a* and 32*b* is equivalent to the adjustment of a central angle of the fan-like shape.

One or both of the diameter D of the central portion 31 and the maximum length L in the direction orthogonal to the radial direction of the central portion 31 between the extension portions 32*a* and 32*b* are adjusted in such a manner that the phase-load characteristics of the variable capacitor of the first embodiment will have desirable characteristics.

Note that the adjustment of the maximum length L is equivalent to the adjustment of the central angle of the fan-like shape. Therefore, one or both of the diameter D of the central portion 31 and the central angle of each of the extension portions 32*a* and 32*b* may be adjusted so that the phase-load characteristics of the variable capacitor of the first embodiment will have desirable characteristics.

In addition, it is also possible to carry out the fine adjustment of the characteristics by adjusting not only the diameter D of the central portion 31 of the second electrode 3 and the maximum length L in the direction orthogonal to the radial direction of the central portion 31 between the extension portions 32*a* and 32*b*, but also lengths of other various portions, curvatures of curved portions, and the like.

It is to be noted that the shape of the second electrode 3 is by no means limited to those described above. FIGS. 10A to 10E are views explaining other examples of the shape of the second electrode 3. While a shape of the second electrode 3 shown in FIG. 10A has the central portion 31 and the extension portions 32*a* and 32*b* similarly to the shape of the second electrode 3 described above, a shape of each of the extension portions 32*a* and 32*b* is different from those described above.

Figure 10C:
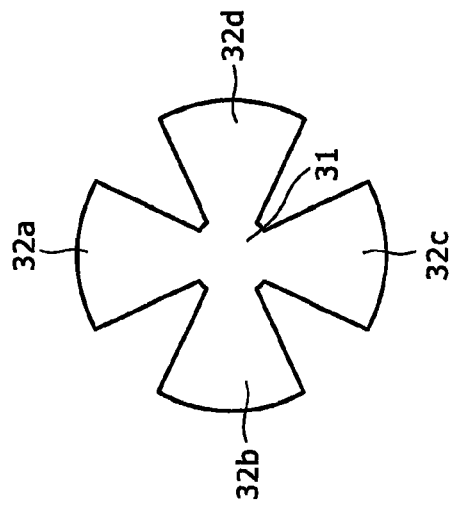
FIGS. 10A to 10E are views explaining other examples of the shape of the second electrode in the variable capacitor shown in FIG. 2.
Figure 10B:
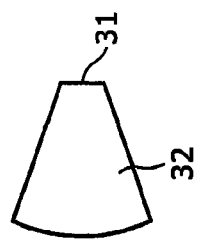
Figure 10E:
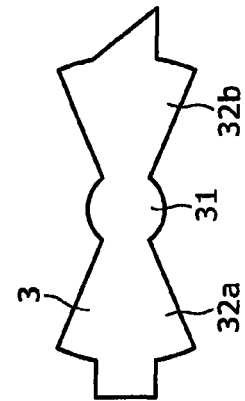
Figure 10A:
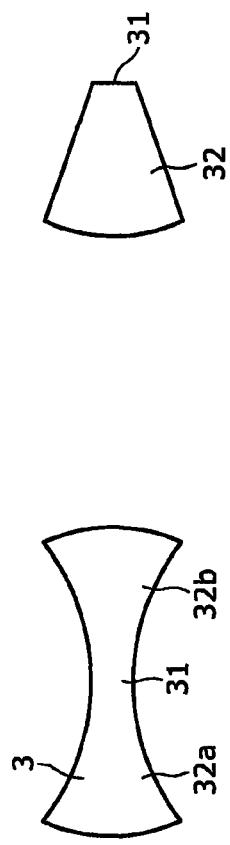

Specifically, in the second electrode 3 shown in FIG. 10A, in the extension portions 32*a* and 32*b*, sides extending from the central portion 31 to respective end portions formed of arcs (outer edges) are formed into circular arc shapes along the insides of the extension portions 32*a* and 32*b*. This way, the shapes of the side portions of the extension portions 32*a* and 32*b* can be adjusted so as to have curves in addition to straight lines.

In the second electrode 3 shown in FIG. 10B, only one extension portion 32 is provided. That is, while any of the second electrodes 3 described above has the extension portions 32*a* and 32*b* so as to sandwich the central portion 31 between them, the second electrode 3 shown in FIG. 10B has a structure such that only one of the extension portions 32*a* and 32*b* is provided.

In the second electrode 3 shown in FIG. 10C, the number of extension portions is increased up to four. That is, the second electrode 3 shown in FIG. 10C is composed of an octagon-like central portion 31, and four extension portions 32*a*, 32*b*, 32*c*, and 32*d*.

The number of extension portions is increased so as to mainly adjust the inclination of the phase-load characteristics of the variable capacitor. It is to be noted that the size and number of extension portions can be varied, and the shape of the central portion 31 can also be made as a circular shape, a polygonal shape or the like. Thus, the extension portions can be provided along plural radial directions each extending from the center of the central portion 31 toward the outside.

Figure 10D:
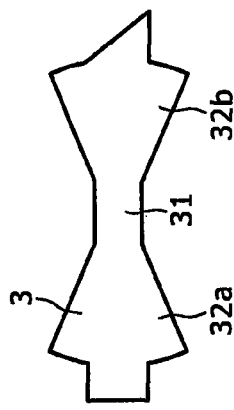

Each of the second electrodes 3 shown in FIGS. 10D and 10E, respectively, has the central portion 31 and the extension portions 32*a* and 32*b*, but a shape of the central portion 31 is different from any of those described above. That is to say, in the case of the second electrode 3 shown in FIG. 10D, the central portion 31 has a quadrangular shape. The central portion 31 can have any of the quadrangular shapes such as a square, a rectangle, and a trapezoid. In the case of the second electrode 3 shown in FIG. 10E, the central portion 31 is formed to have a circular shape. It is to be noted that a diameter of the circular central portion 31 can have any of various values. The shape of the central portion 31 is changed so as to mainly adjust the rising characteristics of the variable capacitor.

Since the inside of the housing 6 is formed so as to have the cylindrical shape, the extension portion of the second electrode 3 in the first embodiment described above has an approximately fan-like shape (with an arc-shaped outer edge), except for the terminal portion and the engagement portion, so as to agree with the cylindrical shape. However, the present invention is by no means limited thereto. That is to say, the extension portion can also have, for example, any of a trapezoid, a triangle and other various shapes, each not including a circular arc portion.

In other words, all it takes is that, with regard to the shape of the second electrode 3 including the central portion and the extension portions, when the second electrode 3 contacts the other surface 1*b* of the dielectric 1 by applying thereto the pressing force, the contact area is small at the beginning of the contact, and thereafter, the contact area is rather substantially (largely) increased without the contact area peaking out in accordance with the pressing force. As a result, the phase-load characteristics (pen pressure characteristics) of the variable capacitor can be improved in such a way that the rising characteristic is good, the linearity is achieved, and the hysteresis becomes small.

[Position Indicator Using the Variable Capacitor of the First Embodiment]

Figure 11:
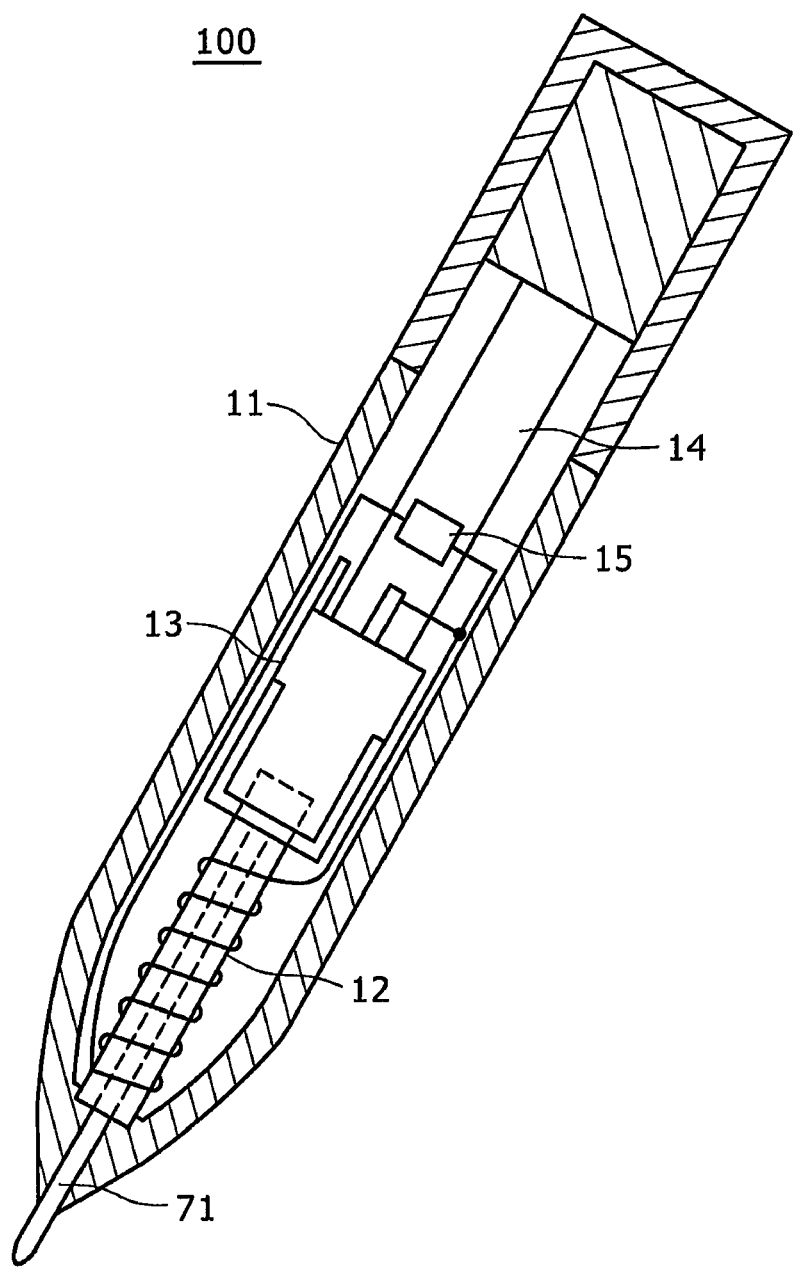
FIG. 11 is a cross sectional view showing the position indicator of one embodiment, using the variable capacitor shown in FIG. 2.

Next, description will be given with respect to a position indicator constructed by using the variable capacitor of the first embodiment descried with reference to FIG. 1 to FIGS. 10A to 10E. FIG. 11 is a cross sectional view explaining the position indicator 100 of an embodiment according to the present invention using the variable capacitor of the first embodiment. That is, FIG. 11 is the cross sectional view taken along line A—A' of the position indicator 100 shown in FIG. 1. In FIG. 11, reference numeral 11 designates a pen case, reference numeral 12 designates a coil, reference numeral 13 designates the variable capacitor of the first embodiment described above, reference numeral 14 designates a board, and reference numeral 15 designates a capacitor.

The pen case 11 is made of a non-metallic material such as a synthetic resin, and includes an open hole through which the core body 71 can be inserted on a tip side thereof. The coil 12 is obtained by winding a litz wire having a small high-frequency resistance around a ferrite core, which includes an opening hole through which the core body 71 can be slidably inserted. The coil 12 is held between the tip side of the pen case 11 and the variable capacitor 13. Note that one (proximal) end of the coil 12 is accommodated and held within a through hole 622 of the second housing member 62 (FIG. 3) composing the variable capacitor 13.

The board 14 is used for mounting thereto the capacitor 15, and fixing thereto the variable capacitor 13. One side of the board 14 is fixed to a bottom portion of the first housing member 61 of the variable capacitor 13, and the other side thereof is brought into contact with the bottom portion of the pen case 11. It is to be noted that a protrusion piece for fixing the board 14 thereto may be provided integrally with the bottom portion of the first housing member 61. The capacitor 15 is a well-known chip capacitor or the like. The capacitor 15 is connected together with the variable capacitor 13 in parallel with the coil 12, thereby forming a well-known resonance (tuning) circuit.

In the position indicator 100, the capacitance value of the variable capacitor 13 is much smaller than that of the capacitor 15 unless one end 71*a* of the core body 71 is pressed against an input surface or the like of the detecting portion 201 of the position detector (tablet) 200 with a given pressure or more. Therefore, a resonance frequency of the resonance circuit is substantially determined by the values of the coil 12 and the capacitor 15. On the other hand, when one end 71*a* of the core body 71 is pressed against the input surface or the like of the detecting portion 201 of the position detector 200 with a given pressure or more, the variable capacitor 13 comes to have such a capacitance value as to exert an influence on the resonance frequency of the resonance circuit, and thus the resonance frequency of the resonance circuit is changed. After that, as the pressure applied to one end 71*a* of the core body 71 is further increased, the capacitance value of the variable capacitor 13 is changed in proportion to the pressure applied to the core body 71, and the resonance frequency of the resonance circuit is also changed in proportion to the pressure.

As has been described, according to the position indicator 100 constructed by using the variable capacitor of the first embodiment, the resonance frequency of the resonance circuit can be clearly changed between the state in which the given pressure or more is not applied and the state in which the given pressure or more is applied. Thus, switch-like information can be transmitted. Also, after that, in the position indicator 100, the resonance frequency of the resonance circuit can be continuously changed in proportion to the pressure, and the continuous pen pressure information can be transmitted to the tablet side.

In the resonance circuit not having a power source as described above, a very small amount of current is caused to flow through the resonance circuit. Thus, when an existing mechanical switch is used, it may be impossible to maintain the performance based on a self-cleaning operation of the existing mechanical switch, and thus the durability of a position indicator may be poor. However, in the case of the position indicator 100, using the variable capacitor 13 of the first embodiment results in that stable information can be transmitted to the position detector (tablet) 200 side for a long term.

As described above, the capacitance value of the variable capacitor 13 is changed in accordance with a change in the slight gap defined between the dielectric and the electrode, and the displacement amount is very small (equal to or smaller than about several tens of micrometers), to thereby achieve a smooth and natural feeling of movement. Furthermore, since in the variable capacitor of the first embodiment, the second electrode 3 has, for example, the shape shown in FIG. 4, the phase-load characteristics (pen pressure characteristics) are changed more linearly in accordance with the user operation, and thus more detailed information can be inputted.

[Variable Capacitor of the Second Embodiment]

Next, description will be given with respect to the variable capacitor of a second embodiment of the present invention. The variable capacitor of the second embodiment is realized by the following technique used in the variable capacitor disclosed in Patent Document 3 described above, and by further improving that technique. It is to be noted that for the sake of simplifying the description, in the variable capacitor of the second embodiment, portions which are formed similarly to those in the variable capacitor of the first embodiment described with reference to FIG. 2 to FIGS. 10A to 10E are designated by the same reference numerals, respectively, and a detailed description thereof is omitted.

Figure 12:
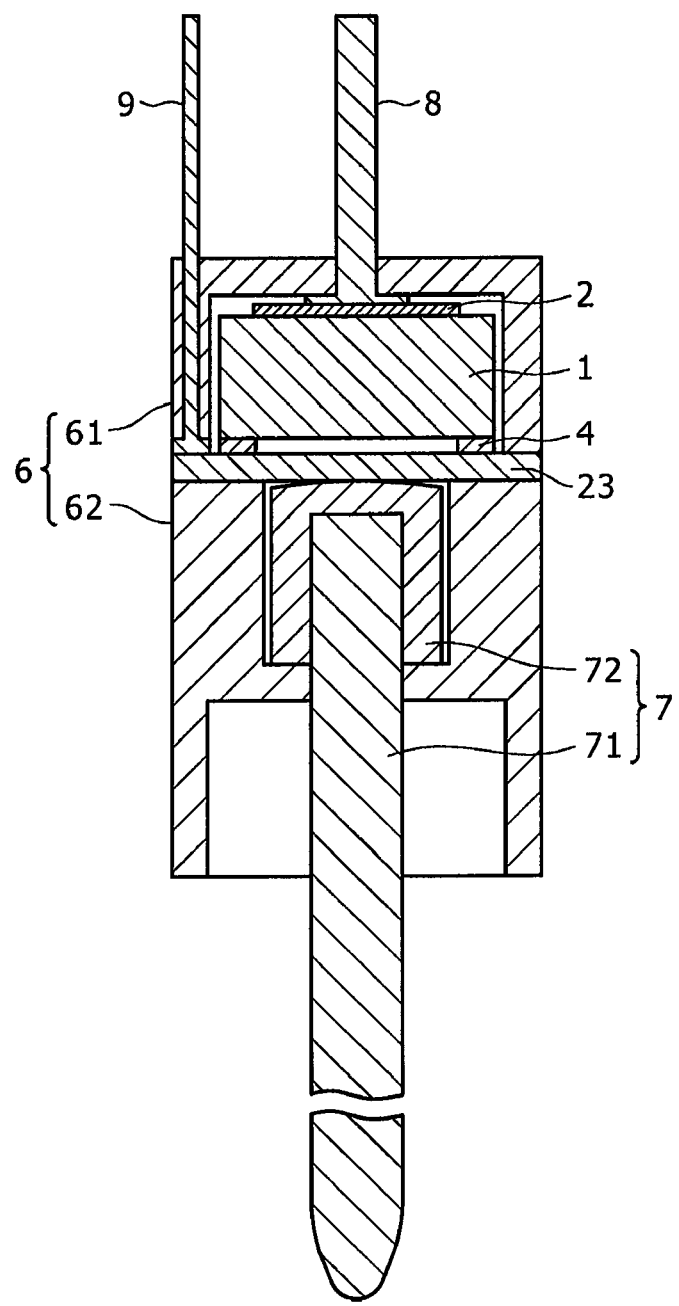
FIG. 12 is a cross sectional view explaining the variable capacitor of a second embodiment of the present invention.

FIG. 12 is a cross sectional view showing a construction of the variable capacitor of the second embodiment. As can be seen by comparing the cross sectional view of FIG. 12 with the cross sectional view showing the construction of the variable capacitor of the first embodiment shown in FIG. 2, the variable capacitor of the second embodiment has roughly the same construction as that of the variable capacitor of the first embodiment. The variable capacitor of the second embodiment shown in FIG. 12 is different from the variable capacitor of the first embodiment in that a second electrode 23 is provided instead of a combination of the second electrode 3 and the elastic body 5 as shown in FIG. 2, to form the variable capacitor.

Figure 13A:
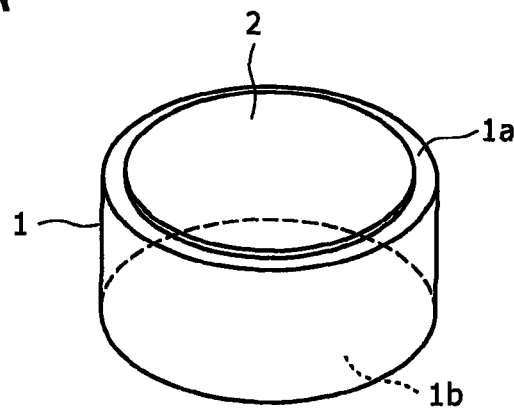
FIGS. 13A to 13C are exploded views explaining main members composing the variable capacitor shown in FIG. 12.
Figure 13B:
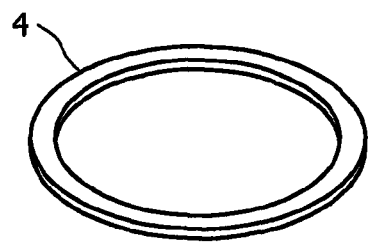
Figure 13C:
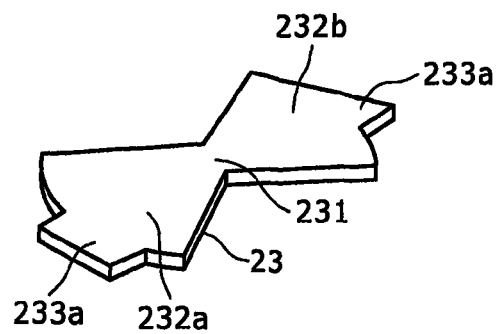

FIGS. 13A to 13C are exploded perspective views showing the shapes of the dielectric 1 and the members which are brought into contact with the dielectric 1, which are the main members forming the variable capacitor of the second embodiment. When FIGS. 13A to 13C are compared with FIG. 3, the difference between the variable capacitor of the first embodiment described above and the variable capacitor of the second embodiment becomes clearer. As shown in FIG. 13A, the dielectric 1 is made of an approximately disc-like hard material having one surface 1*a* and the other surface 1*b* on a side opposite to the surface 1*a* as mutually parallel two surfaces. In this case, the dielectric material 1 is made of a ceramics which is 2 mm in thickness, 4.6 mm in diameter, and about 5,800 in relative permittivity.

The first electrode 2 is made of an approximately disc-like silver plate which is 0.2 mm in thickness and is 4.0 mm in diameter, and is sintered to be mounted to one surface 1*a* of the dielectric 1. The other surface 1*b* of the dielectric 1 is mirror-finished in the case of the variable capacitor of the first embodiment. However, since the second electrode 23 is made of a conductive rubber in the case of the variable capacitor of the second embodiment, it becomes unnecessary to carry out the mirror finishing. Since the ceramics dielectric is a sintered body, a surface thereof is in a textured state depending on a grain size (in the range of about several micrometers to about several tens of micrometers), but desired characteristics can be sufficiently satisfied even in an unglazed surface state.

The second electrode 23 is made of a conductive rubber having a thickness of 0.4 mm, and a shape thereof is the same as that of the second electrode 3 in the first embodiment, for example, as described with reference to FIG. 4. That is, the second electrode 23 of the variable capacitor of the second embodiment has a central portion 231, extension portions 232*a* and 232*b*, and terminal portions 233*a* and 233*a* on both sides.

Here, the central portion 231 corresponds to the central portion 31 in the first embodiment, and the extension portions 232*a* and 232*b* correspond to the extension portions 32*a* and 32*b* in the first embodiment, respectively. In addition, the terminal portions 233*a* and 233*a* correspond to the terminal portions 33*a* and 33*a* in the first embodiment, respectively. Therefore, in the second electrode 23, the central portion 231 and the extension portions 232*a* and 232*b* form an abutment surface 23*a* with the other surface 1*b* of the dielectric 1. The shape of the second electrode 23 including cut portions (if restored) is a disc-like shape (a flat plate-like shape) having a diameter of 4.6 mm.

Here, the conductive rubber forming the second electrode 23 is a synthetic rubber obtained by mixing conductive particles such as carbon particles or silver particles, and thus is a material which has a conductive property, and also has elasticity as well as flexibility. In general, a conductive rubber in a broad sense is classified into a rubber of a type whose electrical resistance value depends on a pressure, that is, a rubber whose resistance value has a tendency to be reduced when a pressing force applied thereto becomes larger (hereinafter referred to as "a pressure-sensitive rubber"), and a rubber of a type whose electrical resistance value does not depend on a pressure (hereinafter referred to as "a narrowly-defined conductive rubber").

Any of these two types of rubbers can be used in the second electrode 23 in the variable capacitor of the second embodiment. In the second embodiment of the present example, the narrowly-defined conductive rubber is used, whose rubber hardness and volume specific resistance according to the Japanese Industrial Standards are 70 and 5 ohms or less, respectively.

The spacer 4 is made of a polyimide film which is 40 μm in thickness and is 3.5 in relative permittivity. The spacer 4 is formed into a ring-like shape which is 4.6 mm in outer diameter and is 2.0 mm in inner diameter.

It is to be noted that the housing portion 6, the pressing portion 7, and the terminals 8 and 9 in the variable capacitor of the second embodiment have the same construction as those of the housing portion 6, the pressing portion 7, and the terminals 8 and 9 in the variable capacitor of the first embodiment, respectively.

Figure 14A:
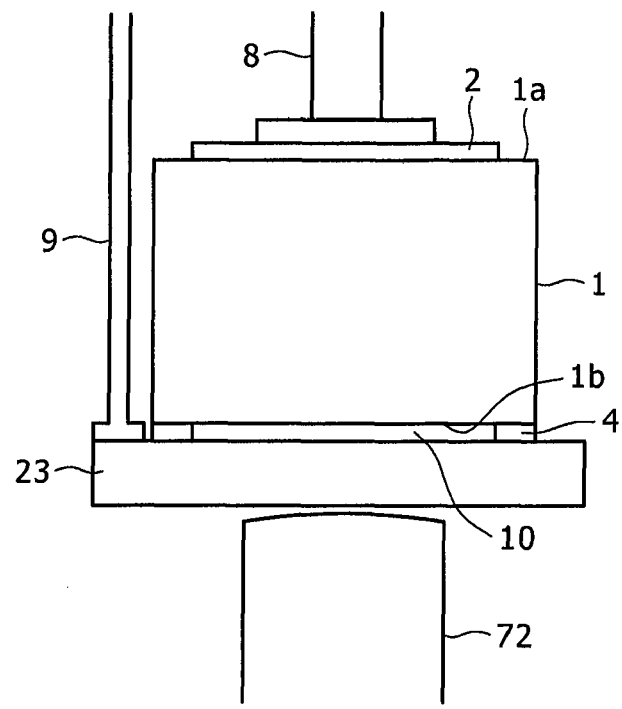
FIGS. 14A and 14B are views explaining an operation of the variable capacitor shown in FIG. 12.
Figure 14B:
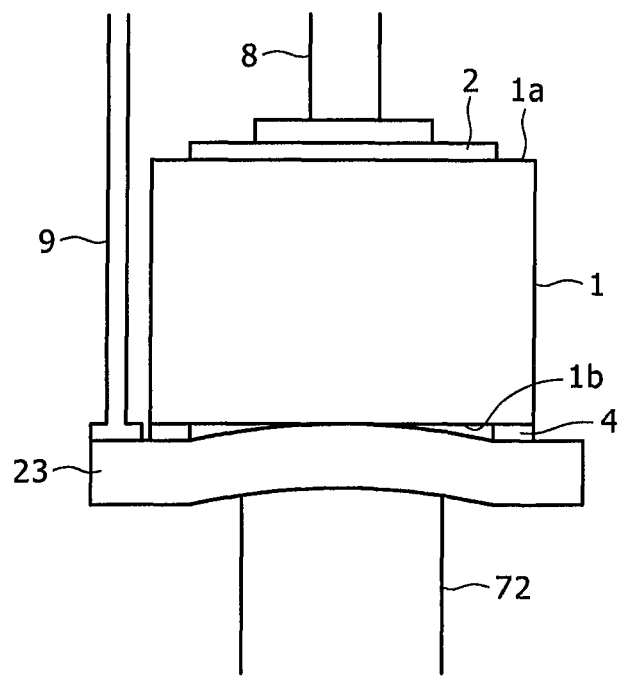

FIGS. 14A and 14B are views explaining an operation of the variable capacitor of the second embodiment. In the variable capacitor of the second embodiment, in a state in which no pressure (or no displacement) is applied to the core body 71 (in an initial state), the other surface 1b of the dielectric 1 and the second electrode 23 are separated by a distance corresponding to a thickness of the spacer 4 from each other except for a peripheral portion of the other surface 1b of the dielectric 1 as shown in FIG. 14A. Thus, an air layer 10 is defined between the other surface 1b of the dielectric 1 and the second electrode 23. Therefore, a capacitance value (the initial capacitance value) detected between the terminals 8 and 9 at this time is approximately a serial composite capacitance of a capacitance based on the dielectric 1 and a capacitance based on the air layer 10 having a relative permittivity of 1.0, and thus is considerably small.

On the other hand, when a pressure (or a displacement) is applied to the core body 71, and the cap body 72 bends the second electrode 23 toward the dielectric 1 side, a thickness of the air layer 10 becomes smaller than that of the spacer 4. At this time, the capacitance based on the air layer 10 is increased in inverse proportion to the thickness of the air layer 10, and accordingly the capacitance value detected between the terminals 8 and 9 also increases. Since the second electrode 23 has elasticity, the pressing force which is transmitted to the second electrode 23 through the cap body 72 is uniformly dispersed, which operates to smoothly decrease the thickness of the air layer 10.

After that, when the pressing force (or the displacement) applied to the core body 71 is increased, as shown in FIG. 14B, the second electrode 23 contacts the other surface 1b of the dielectric 1. Then, only the capacitance based on the dielectric 1 is obtained in the contact portion, and the capacitance value detected between the terminals 8 and 9 is increased approximately in proportion to the contact area.

As has been described, in the case of the variable capacitor of the second embodiment, the capacitance value which is largely changed in a manner corresponding to the pressing force or a very small displacement applied to one end of the pressing body 7 is taken out from the terminals 8 and 9.

In the case of the variable capacitor of the second embodiment, the second electrode 23 has the same shape as that of the second electrode 3 of the variable capacitor of the first embodiment described with reference to FIG. 4. That is, in the second electrode 23 in the variable capacitor of the second embodiment, as shown in FIGS. 13A to 13C, the area of each of the central portion 231 is small, and the area of each of the extension portions 232a and 232b becomes larger toward the outside. For this reason, as the pressing force applied to the second electrode 23 becomes larger, the area of the second electrode 23 contacting the other surface 1b of the dielectric 1 becomes linearly larger.

In other words, in the case of the variable capacitor of the second embodiment, unlike the existing hard-type variable capacitor described with reference to FIG. 23 to FIGS. 25A and 25B, the contact area between the dielectric 1 and the second electrode 23 increases substantially linearly, without peaking out as the pressing force is further increased. Therefore, in the case of the variable capacitor of the second embodiment, with regard to the phase-load characteristics as well, it is possible to prevent the change in phase from peaking out with the increase in load.

Also, in the case of the variable capacitor of the second embodiment, a suitable output value is obtained even in a region in which the pressing force is small because the second electrode 23 is made of a conductive rubber. In addition, as described above, the second electrode 23 has the shape shown in FIG. 13C, and thus the phase-load characteristics (pen-pressure characteristics) are more linear and the hysteresis is relatively small.

[Modifications to the Variable Capacitor of the Second Embodiment]

It is to be noted that the shape of the second electrode 23 in the variable capacitor of the second embodiment can also be variously adjusted similarly to the case of the first embodiment described with reference to FIGS. 7A to 7D to FIGS. 9A to 9D. In addition, the second electrode 23 of the variable capacitor of the second embodiment can also have any of various kinds of shapes similarly to the case of the first embodiment described with reference to FIGS. 10A to 10E.

[Position Indicator Using the Variable Capacitor of the Second Embodiment]

It is to be noted that in the position indicator 100 constructed by using the variable capacitor 13 of the first embodiment described with reference to FIG. 11, the variable capacitor 13 can be replaced with the variable capacitor of the second embodiment described with reference to FIG. 12 to FIGS. 14A and 14B. As a result, the position indicator 100 using the variable capacitor of the second embodiment described with reference to FIG. 12 to FIGS. 14A and 14B can be constructed as the position indicator of a second embodiment of the present invention. As described above, the capacitance value of the variable capacitor 13 of the second embodiment is changed in accordance with a change in the slight gap defined between the dielectric and the electrode, and the displacement amount is very small (equal to or smaller than about several tens of micrometers), to thereby achieve a smooth and natural feeling of movement.

It is to be noted that although the movement direction of the pressing body in the variable capacitor 13 of the first and second embodiments agrees with the pen axis direction, the movement direction of the pressing body can be made orthogonal to the pen axis direction, so that the pressing body can be pressed through a manipulation button or the like provided on a side surface by a finger of the user.

[Variable Capacitor of the Third Embodiment]

Next, description will be given with respect to the variable capacitor of a third embodiment of the present invention. The variable capacitor of the third embodiment is realized by following the technique used in the variable capacitor disclosed in the previous application (Japanese Patent Application No. 2008-305556) described above, and by further improving that technique.

Figure 15:
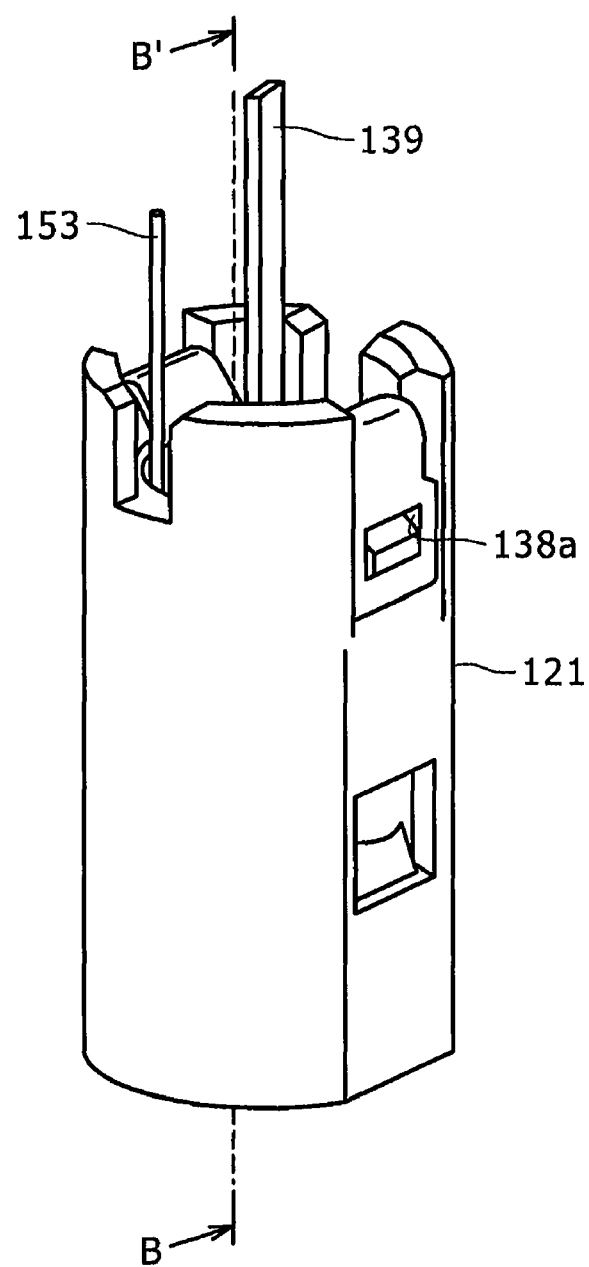
FIG. 15 is a perspective view explaining the variable capacitor of a third embodiment of the present invention.
Figure 16:
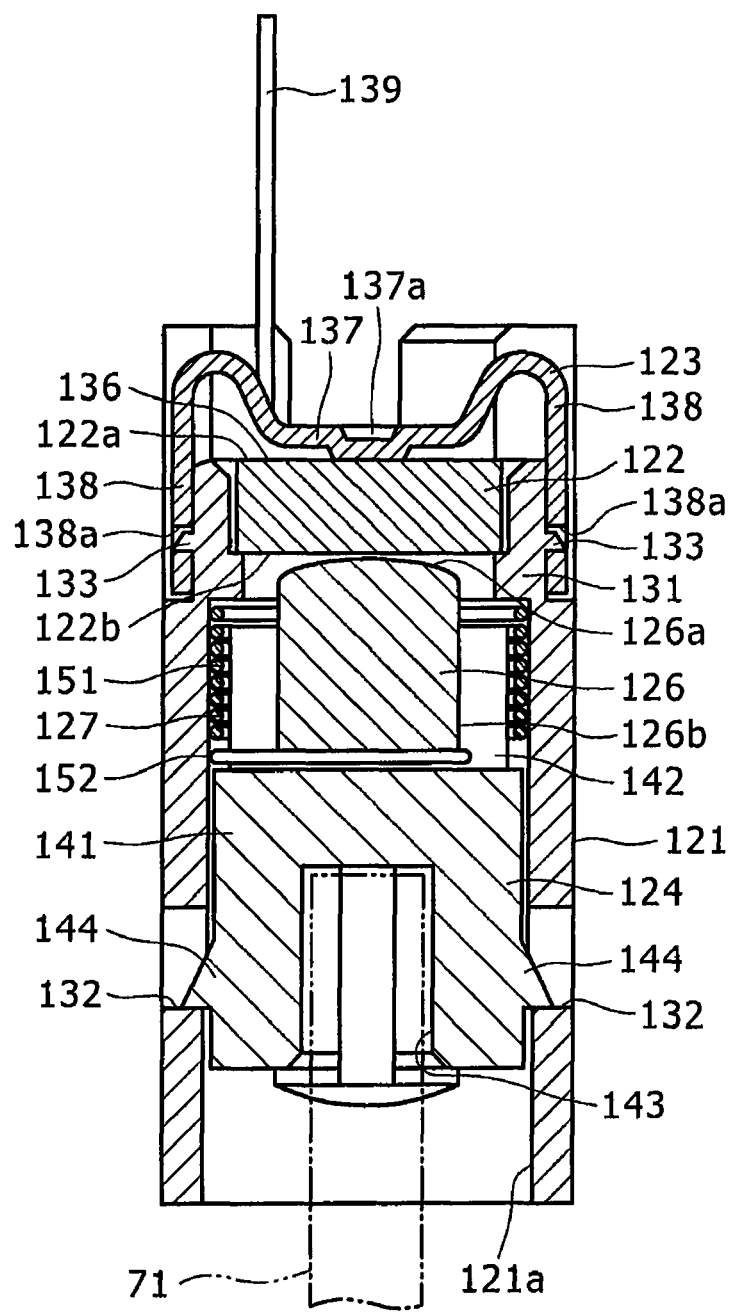
FIG. 16 is a cross sectional view explaining the third embodiment of the variable capacitor shown in FIG. 15.

FIG. 15 is a perspective view of the variable capacitor of the third embodiment, and FIG. 16 is a cross sectional view taken along line B-B' of the variable capacitor shown in FIG. 15. The variable capacitor of the third embodiment also changes its capacitance value in accordance with the pressure applied thereto similarly to the case of each of the variable capacitor of the first and second embodiments described above.

Inside of a housing 121 of the variable capacitor of the third embodiment has a hollow approximately cylindrical shape. The inside of the housing 121 is loaded with a main portion of the variable capacitor of the third embodiment, and a terminal (lead piece) 139 and a terminal (terminal piece) 153 are drawn from an upper portion of the housing 121. As shown in FIG. 16, a dielectric 122, a terminal member 123 for urging the dielectric 122, a holding member 124, a conductive member 126, and an elastic member 127 are provided inside the housing 121.

The dielectric 122 shown in FIG. 16 has, for example, an approximately disc-like shape. The dielectric 122 has an approximately circular first surface 122a, and an approximately circular second surface 122b which opposes the first surface 122a so as to be approximately parallel with the first surface 122a. A first electrode 136 is provided approximately throughout the first surface 122a. The first electrode 136 is formed, for example, by sintering and mounting a silver plate to the first surface 122a. A mirror treatment is carried out on the second surface 122b by, for example, mirror-finishing a surface of the second surface 122b.

As shown in FIG. 16, the dielectric 122 is placed on a flange portion 131 with the second surface 122b being directed to the other (bottom in FIG. 6) end side of the axial direction of the housing 121. In addition, the dielectric 122 is urged to the other (bottom) end side in the axial direction of the housing 121 by the terminal member 123 in a state in which the dielectric 122 is placed on the flange portion 131. It is to be noted that the dielectric 122 may be formed into a flat plate-like shape such as an approximately quadrangular shape or an approximately hexagonal shape in addition to the approximately disc-like shape. Although an example is described in which the mirror treatment is carried out on the second surface 122b, the mirror treatment need not be carried out on the second surface 122b.

The terminal member 123 has a flat portion 137, which is a concrete example of a contact point portion, two engagement portions 138 and 138 which are formed continuously from the flat portion 137, and a lead piece 139. The flat portion 137 is formed in an approximately flat plate, and a protrusion 137a is provided approximately at the center of the flat portion 137. The two engagement portions 138 and 138 are concrete examples of a second engagement portion.

The two engagement portions 138 and 138 are provided so as to sandwich the flat portion 137 between them. Each of the engagement portions 138 and 138 has an approximate L letter-like shape. Each of the engagement portions 138 and 138 is folded twice from an outer edge of the flat portion 137, thereby achieving elasticity. Opening portions 138a are provided in end portions of the engagement portions 138, respectively, each having, for example, an approximately quadrangular shape.

The lead piece 139 is provided so as to protrude in a direction opposite to a direction along which each of the end portions of the engagement portions 138 protrudes. It is to be noted that a material obtained by plating titanium-copper with silver, or the like, for example, may be used as a material for the terminal member 123.

As shown in FIGS. 15 and 16, the opening portions 138a and 138a of the two engagement portions 138 and 138 are engaged with engagement receiving portions 133 and 133 of the housing 121, thereby fixing the terminal member 123 to the housing 121. At this time, the flat portion 137 of the terminal member 123 is brought into contact with a first electrode 136 provided in the first surface 122a of the dielectric 122. Since the terminal member 123 provides elasticity to each of the two engagement portions 138 and 138, the terminal member 123 urges the dielectric 122 to the other (bottom) end side in the axial direction of the housing 121. As a result, since the flat member 137 and the first electrode 136 reliably contact each other, a poor electrical contact between the dielectric 122 and the terminal member 123 can be prevented or suppressed. It is also possible to prevent or suppress that the dielectric 122 is inclined within the housing 121.

The protrusion 137a is provided in the flat portion 137 of the terminal member 123, whereby the flat portion 137 and the dielectric 122 surface-contact each other. As a result, the first electrode 136 provided on the first surface 122a of the dielectric 122 and the flat portion 137 of the terminal member 123 reliably contact each other, without being influenced by warpage or floating generated during press-working of the terminal member 123.

As has been described, the terminal member 123 has two parts, that is, a part for urging the dielectric 122 to the housing 121 side, and a part as the electrode terminal connected to the printed wiring board of the position indicator 100 loaded with the variable capacitor. It is to be noted that although in the third embodiment, the description has been given with respect to the case where the terminal member 123 is formed from one member, the flat portion 137 and the two engagement portions 138 and 138 and the lead piece 139 may be formed from different members, respectively.

The holding member 124 has an approximately prismatic base portion 141, and an approximately cylindrical fitting portion 142. An engagement recess portion 143, which is hollowed in an approximately prismatic shape, is provided in the base portion 141. As shown in FIG. 16, the other (proximal) end 71b in the axial direction of the core body 71 is inserted into the engagement recess portion 143. As a result, the holding member 124 and the core body 71 are joined together. Two engagement portions 144 and 144 each having an approximately triangular shape in cross section are provided in two planar portions, facing each other, of a side surface portion of the base portion 141. The two engagement portions 144 and 144 are engaged with two engagement holes 132 and 132, respectively, which are provided in the housing 121. As a result, the holding member 124 is movably supported along the axial direction of the housing 121.

Figure 17:
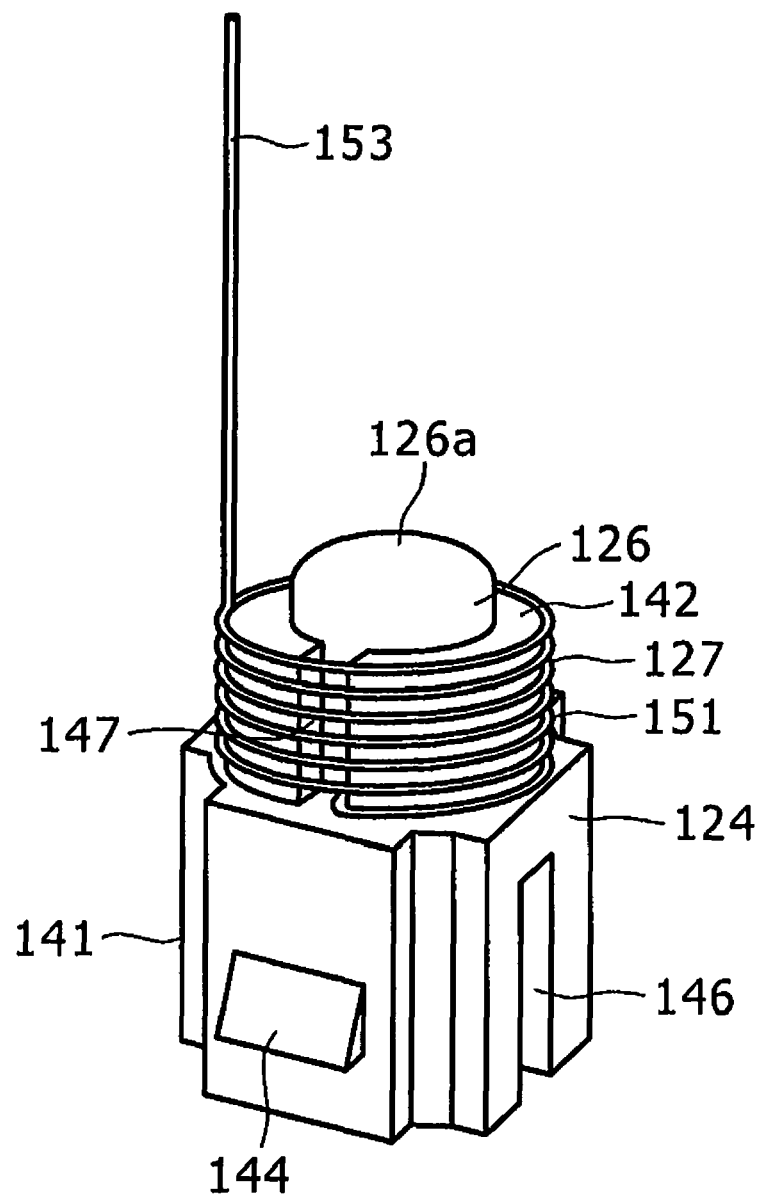
FIG. 17 is a perspective view showing a state in which a conductive member and an elastic member of the variable capacitor shown in FIG. 15 are mounted to a holding member.

Slits 146 and 146 are provided in the base portion 141. FIG. 17 is a perspective view showing a state in which both the conductive member 126 and the elastic member 127 are held by the holding member 124. As shown in FIG. 17, each of the two slits 146 and 146 provided in the base portion 141 is formed in the form of a cut extending over a distance from one end to the other end in the axial direction of the base portion 141.

The fitting portion 142 is a concrete example of a recess portion formed so as to protrude to the other end side of the base portion 141. Two cuts 147 and 147 are formed approximately at an equal angular interval in the fitting portion 142. Each of the two cuts 147 and 147 is formed by cutting a portion from one end in the axial direction of the fitting portion 142 to the base portion 141. It is to be noted that the number of cuts 147 is by no means limited to two, and thus three or more cuts 147 may also be formed. If at least one cut 147 is formed, the desired object of forming the cut can be attained. The conductive member 126 is fitted to the fitting portion 142.

As shown in FIGS. 16 and 17, the conductive member 126 is formed, for example, in a shell shape and has a curved surface portion 126a in one end in the axial direction thereof. The shape of the curved surface portion 126a is different between the variable capacitor of the third embodiment and the variable capacitor in the previous application. It is to be noted that, although details of the shape of the curved surface portion 126a of the conductive member 126 in the variable capacitor of the third embodiment will be described later, for the purpose of comparison, the curved surface portion 126a of the conductive member 126 in FIG. 17 is shown to have the shape of the variable capacitor in the previous application.

A columnar portion 126b on the other end side in the axial direction in the conductive member 126 is fitted to the fitting portion 142 of the holding member 124. It is to be noted that a diameter of the columnar portion 126b of the conductive member 126 is set, for example, so as to be slightly larger than the inner diameter of the fitting portion 142 of the holding member 124. As a result, tight fitting between the conductive member 126 and the fitting portion 142 of the holding member 124 is achieved. Thus, it is possible to prevent or suppress that the conductive member 126 falls off from the fitting portion 142 of the holding member 124.

The conductive member 126 is formed from a member, which has a conductive property and is elastically deformable. A silicon conductive rubber, a Pressure Sensitive Conductive Rubber (PCR), or the like, for example, can be used to form the member. Using such a member results in that a contact area between the second surface 122b of the dielectric 122 and the conductive member 126 is increased correspondingly to an increase in pen pressure (pressure) applied to the core body 71.

The elastic member 127 is, for example, a coil spring having a conductive property, and has a winding portion 151 having elasticity, a terminal piece 153 in one end portion of the winding portion 151, and a connection portion 152 on the other end portion of the winding portion 151.

As shown in FIG. 16, both the conductive member 126 and the elastic member 127 are mounted to the holding member 124, and are accommodated in a cylindrical hole 121a of the housing 121. At this time, the curved surface portion 126a formed in one end side in the axial direction of the conductive member 126 faces the second surface 122b of the dielectric 122, thereby forming a second electrode.

As shown in FIG. 16, when the pressure (pen pressure) is applied to the indicating portion (tip portion) 71a of the core body 71 and hence the side of the variable capacitor of the third embodiment, the holding member 124 of the variable capacitor is pressed against the other (top in FIG. 16) end of the axial portion 71b of the core body 71. As a result, the holding member 124 is moved to one end side in the axial direction of the housing 121. Then, the curved surface portion 126a of the conductive member 126 contacts the second surface 122b of the dielectric 122, thereby forming the second electrode. When a further pressure is applied to the indicating portion 71a of the core body 71, the conductive member 126 is pressed against the second surface 122b of the dielectric 122 to be deformed (flattened). As a result, the contact area between the conductive member 126 and the second surface 122b is changed, so that the capacitance value based on the dielectric 122 is changed. The capacitance value is detected between the terminal member 123 and the elastic member 127. As a result, it is possible to detect the pressure applied to the indicating portion 71a.

As described above, in the case of the variable capacitor of the third embodiment, when no pressure is applied to the core body 71, the conductive member 126 does not contact the dielectric 122. For this reason, the same state exists as that in which the air layer 10 exists in each of the variable capacitors of the first and second embodiments described above, and thus the capacitance value of the variable capacitor is considerably small. On the other hand, when the pressure is applied to the core body 71, the conductive member 126 contacts the dielectric 122, the contact area is increased in accordance with the applied pressure, and thus the capacitance corresponding to the contact area can be detected.

[Shape of the Curved Surface Portion 126a of the Conductive Member 126]

Figure 18A:
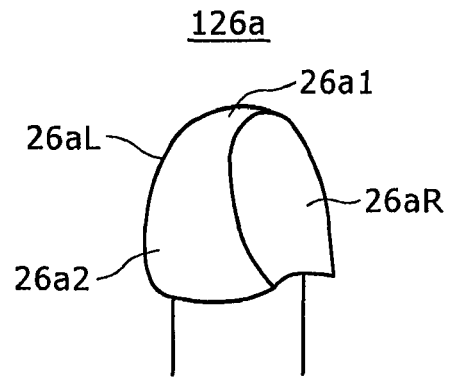
FIGS. 18A and 18B, and 18C are perspective views, and a top plan view, explaining a shape of the conductive member of the variable capacitor shown in FIG. 15, respectively.
Figure 18B:
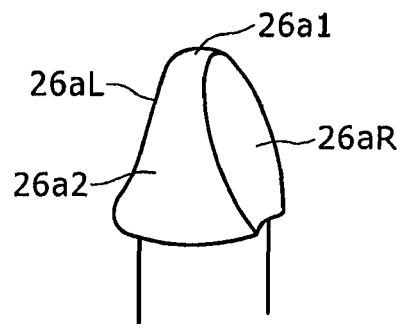
Figure 18C:
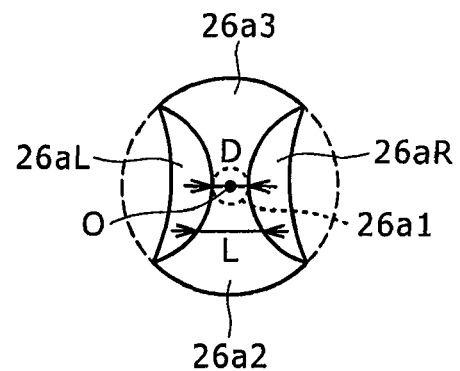

The conductive member 126 of the variable capacitor of the third embodiment, as described above, is formed in a generally shell shape. However, the curved surface portion 126a of the conductive member 126 in the third embodiment is not formed into a dome-like shape as shown in FIG. 17. FIGS. 18A and 18B, and 18C are perspective views, and a top plan view, each showing a shape of the curved surface portion 126a of the conductive member 126 in the variable capacitor of the third embodiment. FIG. 18A is a perspective view showing the curved surface portion 126a when viewed from a cut portion 26aR side. FIG. 18B is a perspective view showing the curved surface portion 126a when viewed from an extension portion 26a2 side. Also, FIG. 18C is a top plan view when the curved surface portion 126a is viewed from directly above.

As shown in FIGS. 18A to 18C, the cut portions 26aR and 26aL are provided on both sides of the curved surface portion 126a of the conductive member 126 in the third embodiment. The curved surface portion 126a of the conductive member 126 in the third embodiment is formed so as to have a central portion 26a1, and extension portions 26a2 and 26a3 sandwiching the central portion 26a1 between them when viewed from an upper surface side. In other words, the central portion 26a1 and the extension portions 26a2 and 26a3 sandwiching the central portion 26a1 between them form a contact portion (or the second electrode), which contacts the second surface 122b of the dielectric 122.

The curved surface portion 126a is formed in such a way that a width of the central portion 26a1 is narrow, and a length in a direction orthogonal to a radial direction (a direction orthogonal to a diameter D in FIG. 18C) of each of the extension portions 26a2 and 26a3 becomes longer toward the outside. Specifically, the central portion 26a1 is a portion which firstly contacts the second surface 122b of the dielectric 122 when the pressing force is applied to the curved surface portion 126a of the conductive member 126 through the core body 71. As indicated by a dotted line circle in FIG. 18C, the central portion 26a1 can be defined as a circular portion, which includes a center O and whose central length (diameter) passing through the center O is D. It is to be noted that the length D can be variously selected.

Each of the extension portions 26a2 and 26a3 is a portion formed in such a way that the portion radially extends from the central portion 26a1 with the center O, and comes to contact the second surface 122b of the dielectric 122 in accordance with the pressing force, and a length L thereof in a direction orthogonal to the radial direction becomes larger as the distance from the central portion 26a1 increases. That is, the curved surface portion 126a of the conductive member 126 in the third embodiment is formed in such a way that a shape of the contact portion between the second surface 122b of the dielectric 122 and the curved surface portion 126a is the same as that of the second electrode 3 in each of the first and second embodiments described above with reference to FIG. 4, and FIGS. 7A to 7D to FIGS. 9A to 9D.

By adopting such a shape, also in the case of the variable capacitor of the third embodiment, when the pressing force is applied to the core body 71, at first, the contact area between the curved surface portion 126a of the conductive member 126 and the second surface 122b of the dielectric 122 is small, and the contact area more linearly increases as the pressing force becomes larger.

In other words, also in the case of the variable capacitor of the third embodiment, unlike the existing hard-type variable capacitor described with reference to FIG. 23 to FIGS. 25A and 25B, the contact area between the dielectric 122 and the curved surface portion 126a of the conductive member 126 forming the second electrode increases linearly without peaking out as the pressing force is further increased. Therefore, in the case of the variable capacitor of the third embodiment, with regard to the phase-load characteristics as well, it is possible to prevent the change in phase from peaking out with the increase in load.

In the case of the variable capacitor of the third embodiment, a more stable output value is obtained even in a region in which the pressing force is small because the conductive member 126 itself is made of a conductive rubber. In addition, as described above, the curved surface portion 126a of the conductive member 126 has the shape shown in FIGS. 18A to 18C and, therefore, the phase-load characteristics (pen-pressure characteristics) are more linear and the hysteresis is relatively small.

[Modifications to the Variable Capacitor of the Third Embodiment]

It is to be noted that the shape of the curved surface portion 126a of the conductive member 126 in the variable capacitor of the third embodiment can also be variously adjusted similarly to the case of each of the first and second embodiments described above with reference to FIGS. 7A to 7D to FIGS. 9A to 9D. In addition, the curved surface portion 126a of the conductive member 126 in the third embodiment can also have any of various kinds of shapes similarly to the case of each of the first and second embodiments described above with reference to FIGS. 10A to 10E.

[Position Indicator Using the Variable Capacitor of the Third Embodiment]

It is to be noted that in the position indicator 100 constructed by using the variable capacitor 13 of the first embodiment described with reference to FIG. 11, the variable capacitor 13 can be replaced with the variable capacitor of the third embodiment described with reference to FIG. 15 to FIGS. 18A to 18C. As a result, the position indicator 100 using the variable capacitor of the third embodiment described with reference to FIG. 15 to FIGS. 18A to 18C can be constructed as the position indicator of a third embodiment of the present invention.

In the variable capacitor of the third embodiment, the conductive member 126 is urged in a direction along which the conductive member 126 is separated from the dielectric 122 by both an elastic force of the elastic member 127 and a restoring force of the curved surface portion 126a of the conductive member 126. As a result, it is possible to realize a more reliable position indicator in which the dielectric 122 and the curved surface portion 126a of the conductive member 126 are always prevented from contacting each other, the elastic member 127 is prevented from being deteriorated, and the durability of the variable capacitor is enhanced.

In the variable capacitor of the third embodiment, it is possible to reduce the hysteresis and it is also possible to reduce the phase difference between when a certain load is applied and when the certain load is removed. As a result, it is possible to readily control the pen pressure, and thus it is possible to enhance the write feeling and touch of the position indicator when the position indicator 100 is loaded with the variable capacitor of the third embodiment.

[Variable Capacitor of the Fourth Embodiment]

Next, description will be given with respect to the variable capacitor of a fourth embodiment of the present invention. The variable capacitor of the fourth embodiment is constructed approximately similarly to the case of the variable capacitor of the third embodiment described with reference to FIG. 15 to FIGS. 18A to 18C. That is, the variable capacitor of the fourth embodiment is constructed similarly to the case of the variable capacitor of the third embodiment except that construction of the dielectric 122 and the conductive member 126 forming the second electrode is different from that in the variable capacitor of the third embodiment. Other than these parts, the variable capacitor of the fourth embodiment is configured similarly to that of the third embodiment.

For this reason, since the variable capacitor of the fourth embodiment is constructed approximately similarly to the case of the variable capacitor of the third embodiment described with reference to FIG. 15 to FIGS. 18A to 18C, description will be focused on the different portions between the variable capacitor of the third embodiment and the variable capacitor of the fourth embodiment.

Figure 19A:
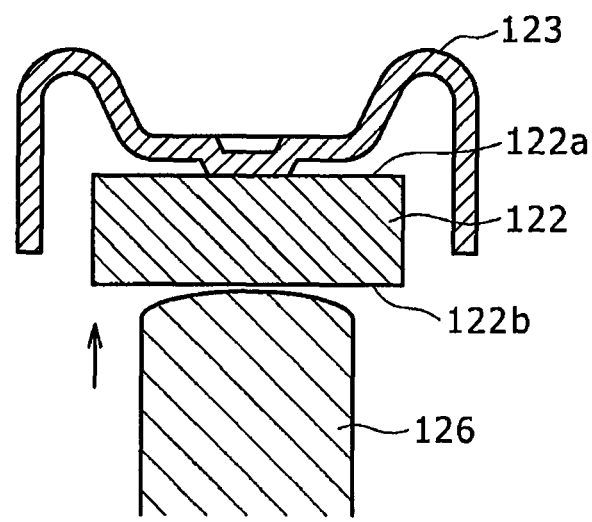
FIGS. 19A and 19B are a cross sectional view and a top plan view explaining the variable capacitor of a fourth embodiment of the present invention, respectively.
Figure 19B:
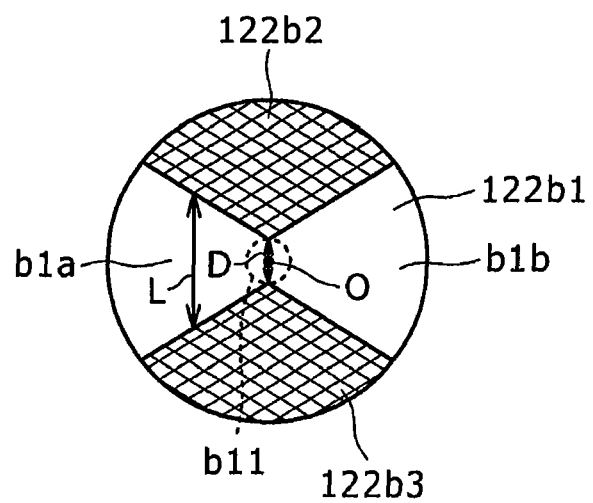

FIGS. 19A and 19B are views explaining main portions of the variable capacitor of the fourth embodiment of the present invention. In the variable capacitor of the fourth embodiment, the portions different between the variable capacitor of the third embodiment described above with reference to FIG. 15 to FIGS. 18A to 18C and the variable capacitor of the fourth embodiment are the dielectric 122 and the conductive member 126 that form the variable capacitor, as shown in FIG. 19A.

In the variable capacitor of the fourth embodiment, the second surface 122b of the dielectric 122 has a construction shown in FIG. 19B. That is, as also described above, the dielectric 122 has an approximately circular disc-like shape. In the dielectric 122 in the variable capacitor of the fourth embodiment, the second surface 122b which contacts the conductive member 126 forming the second electrode, as shown in FIG. 19B, is composed of an electrode contacting portion 122b1 and masked portions 122b2 and 122b3.

Here, the electrode contacting portion 122b1 is a portion through which a dielectric portion having a large permittivity is exposed. Each of the masked portions 122b2 and 122b3 is a portion which is masked with a material such as a rubber, a resin, or a polyimide film whose relative permittivity is close to that of the air as much as possible. Here, the electrode contacting portion 122b1 has the same shape as that of each of the second electrodes in the first and second embodiments. In other words, the electrode contacting portion 122b1 has such a shape as to have a central portion b11 and extension portions b1a and b1b.

The central portion b11 is a portion which contacts the abutting center of the conductive member 126. That is, the central portion b11 is where the conductive member 126 forming the second electrode initially contacts the second surface 122b of the dielectric 122. As indicated by a dotted line circle in FIG. 19B, the central portion b11 can be defined as a circular portion which includes a center O and whose central length (diameter) passing through the center O is D. It is to be noted that the length D can be variously selected.

Each of the extension portions b1a and b1b is a portion formed in such a way that the portion extends to have a radial shape in the radial direction (the direction orthogonal to the diameter D in FIG. 19B) from the central portion b11 with the center O, and comes to contact the conductive member 126 in accordance with the pressing force, and a length L thereof in a direction orthogonal to the radial direction becomes larger as the distance from the central portion b11 increases.

The conductive member 126 has the same shape as that in the variable capacitor disclosed in the previous application described above (Japanese Patent Application No. 2008-305556). That is, the curved surface portion 126a of the conductive member 126 in the variable capacitor of the fourth embodiment has a dome-like shape.

When the pressing force is applied to the core body 71 to push up the conductive member 126, the conductive member 126 and the second surface 122b of the dielectric 122 come to contact each other. At this time, the conductive member 126 contacts the electrode contacting portion 122b1 of the second surface 122b of the dielectric 122. Thus, the area of the portion in which the conductive member 126 contacts the electrode contacting portion 122b1 of the second surface 122b of the dielectric 122 is initially small, and increases more linearly as the pressing force becomes larger.

In other words, it is possible to form a variable capacitor, from which the same output characteristics as those of the variable capacitor of the third embodiment described above are obtained. In the case of the variable capacitor of the fourth embodiment, the conductive member 126 needs not be processed into the shape as shown in FIGS. 18A to 18C. It is only necessary to process the second surface 122b of the dielectric 122 into the shape described with reference to FIG. 19B. Therefore, the fourth embodiment of the variable capacitor can be relatively simply manufactured.

It should be noted that although in the fourth embodiment described above, each of the masked portions 122b2 and 122b3 of the second surface 122b of the dielectric 122 has been described as the portion masked with a rubber or the like, the present invention is by no means limited thereto. Instead, the masked portions 122b2 and 122b3 each indicated by hatching in FIG. 19B may be shaved (scraped), to thereby form an air layer.

[Modifications to the Variable Capacitor of the Fourth Embodiment]

It is to be noted that the shape of the electrode contacting portion 122b1 formed in the second surface 122b of the dielectric 122 in the variable capacitor of the fourth embodiment can also be variously adjusted similarly to the case of each of the second electrodes in the first and second embodiments described with reference to FIGS. 7A to 7E to FIGS. 9A to 9D. In addition, the electrode contacting portion 122b1 formed in the second surface 122b of the dielectric 122 in the variable capacitor of the fourth embodiment can also have any of the various kinds of shapes similarly to the case of each of the second electrodes in the first and second embodiments described with reference to FIGS. 10A to 10E.

[Position Indicator Using the Variable Capacitor of the Fourth Embodiment]

It is to be noted that in the position indicator 100 constructed by using the variable capacitor 13 of the first embodiment described with reference to FIG. 11, the variable capacitor 13 can be replaced with the variable capacitor of the fourth embodiment described with reference to FIGS. 15 to 17, and FIGS. 19A and 19B. As a result, the position indicator 100 using the variable capacitor of the fourth embodiment described with reference to FIGS. 15 to 17 and FIGS. 19A and 19B can be constructed as the position indicator of a fourth embodiment of the present invention.

The basic construction of the variable capacitor of the fourth embodiment is the same as that of the variable capacitor of the third embodiment described above. For this reason, it is possible to realize a more reliable position indicator in which the dielectric 122 and the curved surface portion 126a of the conductive member 126 are always prevented from contacting each other, the elastic member is prevented from being deteriorated, and the durability of the variable capacitor is enhanced.

In the variable capacitor of the fourth embodiment, it is possible to reduce the hysteresis and it is also possible to reduce the phase difference between when a certain load is applied and when the certain load is removed. As a result, it is possible to readily control the pen pressure, and thus it is possible to enhance the write feeling and touch of the position indicator when the position indicator 100 is loaded with the variable capacitor of the fourth embodiment.

What is claimed is:

1. A variable capacitor, comprising:
a dielectric having a first surface and a second surface opposing said first surface;
a first electrode disposed on said first surface of said dielectric;
a second electrode disposed to face said second surface of said dielectric; and
a pressing member configured to cause said second electrode and said dielectric to contact each other when a pressing force is applied thereto,
wherein said second electrode includes at least one electrode piece having an abutting central portion, against which said pressing member transmits the pressing force applied thereto, and two extension portions that radially extend from said abutting central portion in opposite directions toward a circumference of said dielectric, each of the extension portions being shaped to have a width that extends orthogonal to the radially extending direction, and said width in a radially outward portion of the extension portion being greater than said width in a radially inward portion of the extension portion; and
the abutting central portion and the two extension portions are physically and electrically connected to form said at least one electrode piece such that a contact area between said dielectric and said second electrode is increasingly changed in accordance with the pressing force applied to said pressing member, to change a capacitance of the variable capacitor.

2. The variable capacitor according to claim 1, wherein said electrode piece is formed of a conductive elastic member and is formed into a flat plate-like shape.

3. The variable capacitor according to claim 2, wherein said electrode piece has a shape that is line-symmetric about a line that extends through a center of the abutting central portion.

4. The variable capacitor according to claim 2, wherein each of said extension portions has a fan-like shape.

5. The variable capacitor according to claim 4, wherein each of said extension portions has a trapezoidal shape or a triangular shape.

6. The variable capacitor according to claim 4, wherein one or both of a width of said abutting central portion, which extends orthogonal to the radially extending direction of the electrode piece, and a central angle of each of said fan-like shaped extension portion are selectively set so as to controllably change the capacitance of the variable capacitor in accordance with the pressing force applied to said pressing member.

7. The variable capacitor according to claim 4, wherein one or both of a width of said abutting central portion, which extends orthogonal to the radially extending direction of the electrode piece, and a central angle of each of said fan-like shaped extension portion are selectively set so as to controllably change the capacitance of the variable capacitor in accordance with the pressing force applied to said pressing member.

8. The variable capacitor according to claim 1, wherein said electrode piece includes two terminal portions provided at radially outward ends of the two extension portions, respectively.

9. The variable capacitor according to claim 8, wherein the two terminal portions are differently shaped.

10. The variable capacitor according to claim 1, wherein said electrode piece has two pairs of extension portions, each pair consisting of two extension portions that radially extend from said abutting central portion in opposite directions.

11. The variable capacitor according to claim 1, wherein the abutting central portion is formed in a circular shape, a quadrangular shape, or a polygonal shape.

12. A position indicator, comprising:
a variable capacitor including: a dielectric having a first surface and a second surface opposing said first surface; a first electrode disposed on said first surface of said dielectric; a second electrode disposed to face said second surface of said dielectric; and a pressing member configured to cause said second electrode and said dielectric to contact each other when a pressing force is applied thereto, wherein said second electrode includes at least one electrode piece having an abutting central portion, against which said pressing member transmits the pressing force applied thereto, and two extension portions that radially extend from said abutting central portion in opposite directions toward a circumference of said dielectric, each of the extension portions being shaped to have a width that extends orthogonal to the radially extending direction, and said width in a radially outward portion of the extension portion being greater than said width in a radially inward portion of the extension portion; and wherein the abutting central portion and the two extension portions are physically and electrically connected to form said at least one electrode piece such that a contact area between said dielectric and said second electrode is increasingly changed in accordance with the pressing force applied to said pressing member, to change a capacitance of the variable capacitor; and a resonance circuit having said variable capacitor as a circuit element.

13. The position indicator according to claim 12, wherein said electrode piece includes two terminal portions provided at radially outward ends of the two extension portions, respectively.

14. The position indicator according to claim 13, wherein the two terminal portions are differently shaped.

15. The position indicator according to claim 12, wherein said electrode piece has two pairs of extension portions, each pair consisting of two extension portions that radially extend from said abutting central portion in opposite directions.

16. The position indicator according to claim 12, wherein the abutting central portion is formed in a circular shape, a quadrangular shape, or a polygonal shape.

17. The position indicator according to claim 12, wherein said electrode piece is formed of a conductive elastic member and is formed into a flat plate-like shape.

18. The position indicator according to claim 17, wherein said electrode piece has a shape that is line-symmetric about a line that extends through a center of the abutting central portion.

19. The position indicator to claim 17, wherein each Of said extension portions has a fan-like shape.

20. A position indicator, comprising:
a variable capacitor including: a dielectric having a first surface and a second surface opposing said first surface; a first electrode disposed on said first surface of said dielectric; a second electrode disposed to face said second surface of said dielectric; and a pressing member configured to cause said second electrode and said dielectric to contact each other when a pressing force is applied thereto, wherein said second electrode includes at least one electrode piece having an abutting central portion, against which said pressing member transmits the pressing force applied thereto, and two extension portions that radially extend from said abutting central portion in opposite directions toward a circumference of said dielectric, each of the extension portions being shaped to have a width that extends orthogonal to the radially extending direction, and said width in a radially outward portion of the extension portion being greater than said width in a radially inward portion of the extension portion; and wherein abutting central portion and the two extension portions are physically and electrically connected to form said at least on electrode piece such that a contact area between said dielectric and said second electrode is increasingly changed in accordance with the pressing force applied to said pressing member, to change a capacitance of the variable capacitor; and a resonance circuit having said variable capacitor as a circuit element; and a pen-shaped case, wherein said variable capacitor is disposed in the pen-shaped case such that a direction along which a pressing force is applied to the pressing member coincides with a longitudinal direction of said pen case; and a distal tip of the pressing member protrudes from said pen case to form a pen tip.

* * * * *

UNITED STATES PATENT AND TRADEMARK OFFICE
CERTIFICATE OF CORRECTION

PATENT NO. : 8,525,530 B2  
APPLICATION NO. : 13/071308  
DATED : September 3, 2013  
INVENTOR(S) : Yasuyuki Fukushima et al.

Page 1 of 1

It is certified that error appears in the above-identified patent and that said Letters Patent is hereby corrected as shown below:

In the Claims

Column 30, Line 5, Claim 19:
"19. The position indicator to claim 17, wherein each Of" should read, --19. The position indicator to claim 17, wherein each of--.

Column 30, Line 26, Claim 20:
"portion; and wherein abutting central portion and" should read, --portion; and wherein the abutting central portion and--.

Column 30, Line 28, Claim 20:
"connected to form said at least on electrode piece" should read, --connected to form said at least one electrode piece--.

Signed and Sealed this
Thirty-first Day of December, 2013

Margaret A. Focarino
*Commissioner for Patents of the United States Patent and Trademark Office*